United States Patent
Johnson et al.

(10) Patent No.: US 10,875,426 B2
(45) Date of Patent: Dec. 29, 2020

(54) ADJUSTABLE HEADREST FOR JUVENILE VEHICLE SEAT

(71) Applicant: Dorel Juvenile Group, Inc., Foxboro, MA (US)

(72) Inventors: Jason H. Johnson, Brownstown, IN (US); Mei-Hui Lin, Nashville, IN (US); Devin J. Coakley, Bellingham, MA (US); Grant M. Mason, Wrentham, MA (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 95 days.

(21) Appl. No.: 16/142,729

(22) Filed: Sep. 26, 2018

(65) Prior Publication Data

US 2019/0092194 A1 Mar. 28, 2019

Related U.S. Application Data

(60) Provisional application No. 62/563,348, filed on Sep. 26, 2017.

(51) Int. Cl.
*B60N 2/28* (2006.01)
*B60N 2/829* (2018.01)
*B60N 2/815* (2018.01)

(52) U.S. Cl.
CPC ........... *B60N 2/2851* (2013.01); *B60N 2/815* (2018.02); *B60N 2/829* (2018.02)

(58) Field of Classification Search
CPC ....... B60N 2/2851; B60N 2/829; B60N 2/815
See application file for complete search history.

(56) References Cited

U.S. PATENT DOCUMENTS

| | | |
|---|---|---|
| 5,711,579 A | 1/1998 | Albrecht |
| 6,478,377 B2 | 11/2002 | Kassai et al. |
| 6,623,074 B2 | 9/2003 | Asbach et al. |
| 6,626,493 B2 | 9/2003 | Kain |
| 7,066,536 B2 | 6/2006 | Williams et al. |
| 7,140,687 B2 | 11/2006 | Hoekstra et al. |
| 7,370,912 B2 | 5/2008 | Williams et al. |
| 7,862,117 B2 | 1/2011 | Hutchinson et al. |
| 8,172,322 B2 | 5/2012 | Chen |
| 8,272,690 B2 | 9/2012 | Brandl et al. |
| 8,517,471 B2 | 8/2013 | Maddelein et al. |
| 8,567,867 B2 | 10/2013 | Arnold, IV et al. |
| 8,573,686 B2 | 11/2013 | Bruck |
| 8,845,021 B2 | 9/2014 | Hou et al. |
| 9,022,471 B2 | 5/2015 | Gaudreau, Jr. |
| 9,114,739 B2 | 8/2015 | Conway |
| 9,126,513 B2 | 9/2015 | Jeong |
| 9,211,817 B2 | 12/2015 | Leese |
| 9,346,377 B2 | 5/2016 | Xu |
| 9,415,707 B2 | 8/2016 | Böhm |
| 9,499,074 B2 * | 11/2016 | Strong ................ B60N 2/2851 |
| 2012/0261960 A1 | 10/2012 | Heisey et al. |
| 2013/0320725 A1 | 12/2013 | Conway |
| 2014/0021758 A1 | 1/2014 | Chen |
| 2016/0368400 A1 | 12/2016 | Taylor et al. |
| 2017/0008429 A1 | 1/2017 | Johnson et al. |

* cited by examiner

*Primary Examiner* — Anthony D Barfield
(74) *Attorney, Agent, or Firm* — Barnes & Thornburg LLP

(57) ABSTRACT

A child restraint includes a seat bottom and a seat back. The seat back includes a backrest and an adjustable headrest that is mounted for up-and-down movement on the backrest by a caregiver.

19 Claims, 20 Drawing Sheets

ADJUSTABLE HEADREST FOR JUVENILE VEHICLE SEAT

PRIORITY CLAIM

This application claims priority under 35 U.S.C. § 119(e) to U.S. Provisional Application No. 62/563,348, filed Sep. 26, 2017, which is expressly incorporated by reference herein.

BACKGROUND

The present disclosure relates to child restraints and in particular to a juvenile seat provided for use on passenger seat in a vehicle. More particularly, the present disclosure relates to a headrest in a juvenile seat.

SUMMARY

According to the present disclosure, a child restraint includes a headrest. In illustrative embodiments, the child restraint includes a seat bottom and a seat back extending upwardly from the seat bottom and including a backrest and the headrest. The headrest is adjustable so that it can be moved up and down on the backrest to accommodate seated children of different sizes.

In illustrative embodiments, the child restraint includes a headrest-height controller that is mounted on the headrest for up-and-down movement therewith relative to the backrest. The headrest-height controller includes a headrest lock for engaging and disengaging the backrest to control movement of the headrest relative to the backrest, a headrest-lock mover for moving the headrest lock to engage or disengage the backrest, and a mover activator that can be operated by a caregiver to activate the headrest-lock mover when it is desired to disengage the headrest lock from the backrest to free the headrest for up-and-down movement on the backrest.

In illustrative embodiments, the backrest is formed to include several sets of opposing blocker-receiver sockets. Each set is located at a different height above the seat bottom to correspond to one of several predetermined headrest elevation positions that are provided in the backrest and available to be selected by a caregiver using a headrest-height controller included in the child restraint to establish the position of the headrest on the backrest.

In illustrative embodiments, the headrest lock includes two headrest-motion blockers mounted for movement relative to one another on the backrest. Each headrest-motion blocker is sized to extend into one of the two available and opposing blocker-receiver sockets formed in the backrest when the headrest is moved to each one of the several predetermined headrest elevation positions to block further up-and-down movement of the headrest relative to the backrest so that a HEADREST-LOCKING mode of the headrest-height controller is established. The pair of opposing blocker-receiver sockets that are included in each set are arranged to lie in laterally spaced-apart opposing relation to one another. The headrest is locked so that it cannot move up and down relative to the backrest when the headrest-motion blockers extend away from one another into companion blocker-receiver sockets formed in the backrest.

In illustrative embodiments, the mover activator includes an activation handle that extends upwardly along the backrest and provides an exposed handgrip on the front side of the headrest that can be gripped by a caregiver and moved upwardly relative to the backrest to actuate a rack-and-pinion system that is made in accordance with the present disclosure and included in the headrest-lock mover so as to move first and second headrest-motion blockers of headrest lock either into or out of a selected set of opposing blocker-receiver sockets formed in the backrest. A HEADREST-LOCKING mode of the headrest-height controller is established when the headrest-motion blockers are moved laterally away from one another in opposite outward directions to extend into one of the sets of opposing blocker-receiver sockets formed in the backrest. A HEADREST-UNLOCKING mode of the headrest-height controller is established when the headrest-motion blockers are moved laterally toward one another in inward directions to exit from the opposing blocker-receiver sockets in one of the sets of sockets formed in the backrest.

In illustrative embodiments, the rack-and-pinion system provided in the headrest-lock mover of the headrest-height controller in accordance with the present disclosure includes a rotary driver comprising first and second motion-transfer gears. The rotary driver cooperates with gear-engaging racks included in the headrest-lock mover and coupled to each of the activation handle and the headrest-motion blockers to establish the rack-and-pinion system in accordance with the present disclosure.

In a first illustrative embodiment, the first and second motion-transfer gears included in the rotary driver of the headrest-lock mover are unconnected and are arranged to lie in laterally spaced-apart relation to one another to locate the activation handle therebetween. The first motion-transfer gear is a pinion gear that rotates about a first axis of rotation and engages one first-gear rack that is coupled to one side of a lower end of the activation handle and another first-gear rack that is coupled to an upper edge of the first headrest-motion blocker. The second motion-transfer gear is a pinion gear that rotates about a separate second axis of rotation and engages one second-gear rack that is coupled to an opposite side of the lower end of the activation handle and another second-gear rack that is coupled to an upper edge of the second headrest-motion blocker. In use, the first and second motion-transfer gears always rotate in opposite directions relative to one another when the activation handle is moved relative to the backrest by a caregiver.

In a second illustrative embodiment, the first and second motion-transfer gears included in the rotary driver of the headrest-lock mover are connected to one another by a gear mount that is located between the two gears so that the two gears always rotate together about a single (common) axis of rotation in the same direction. The first motion-transfer gear is a pinion gear that extends toward the backrest and engages one first-gear rack that is coupled to the first headrest-motion blocker and another first-gear rack that is coupled to the second headrest-motion blocker. The second motion-transfer gear is a pinion gear that extends away from the backrest and the first motion-transfer gear and engages one second-gear rack that is coupled to one side of a lower portion of the activation handle and another second-gear rack that is coupled to an opposite side of the lower portion of the activation handle and arranged to face toward the one second-gear rack.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

Figures 3A, 3B:
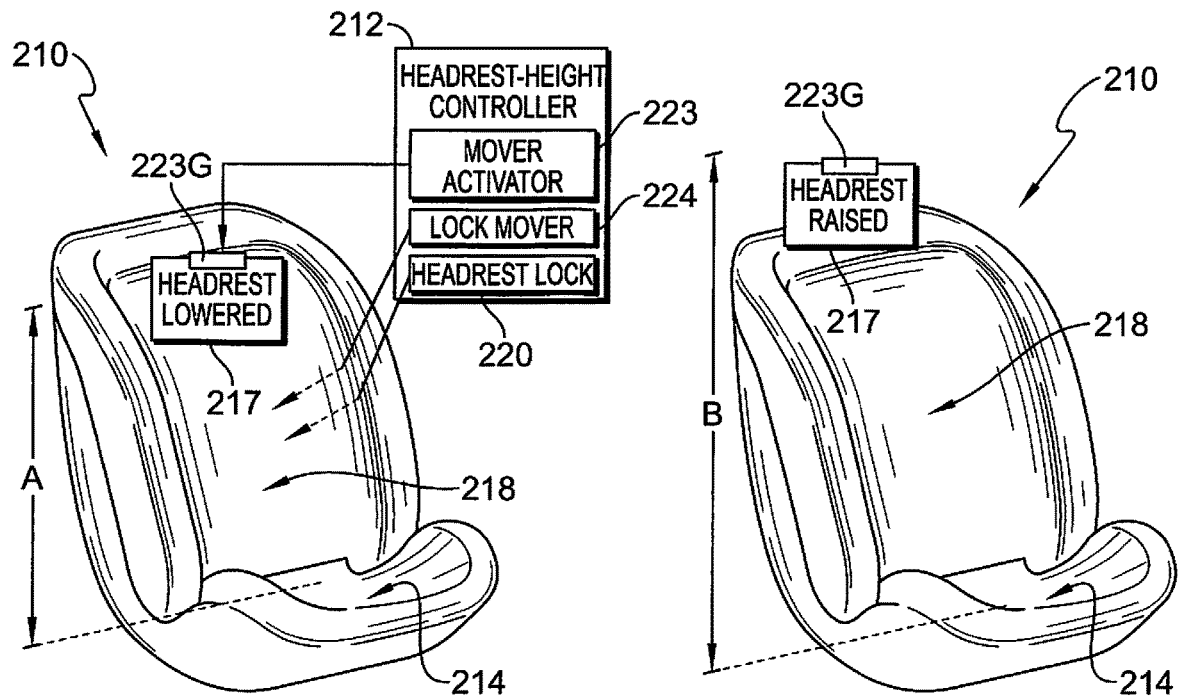
Figure 3C:
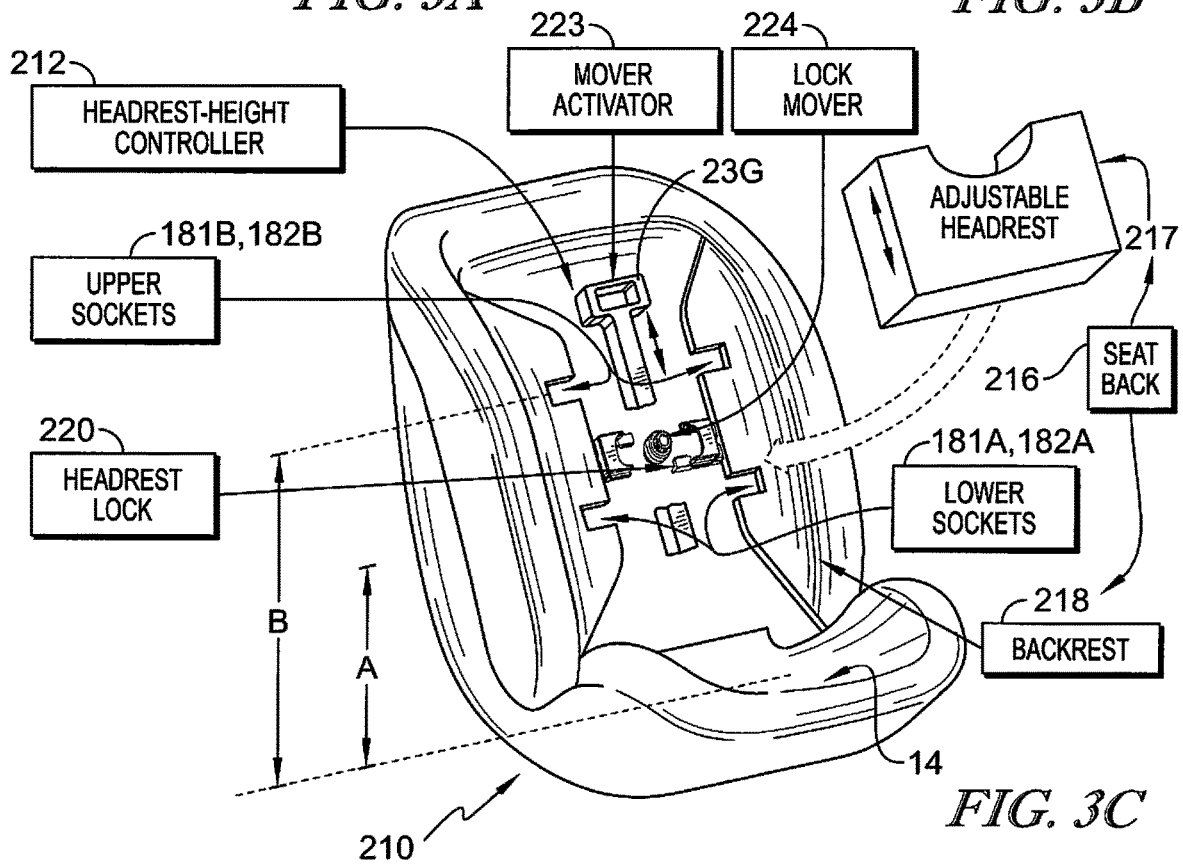
Figure 4A:
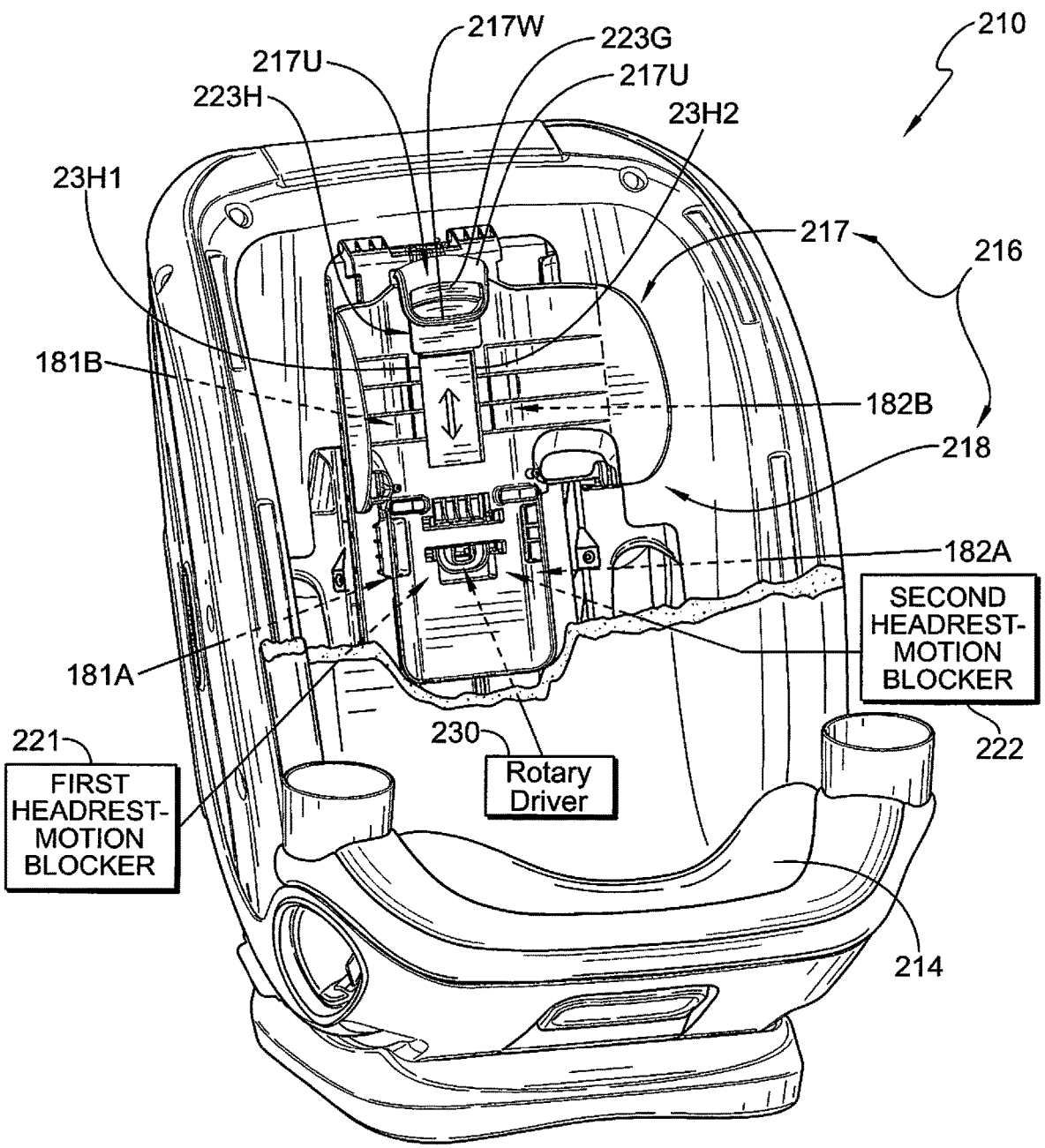
Figure 4B:
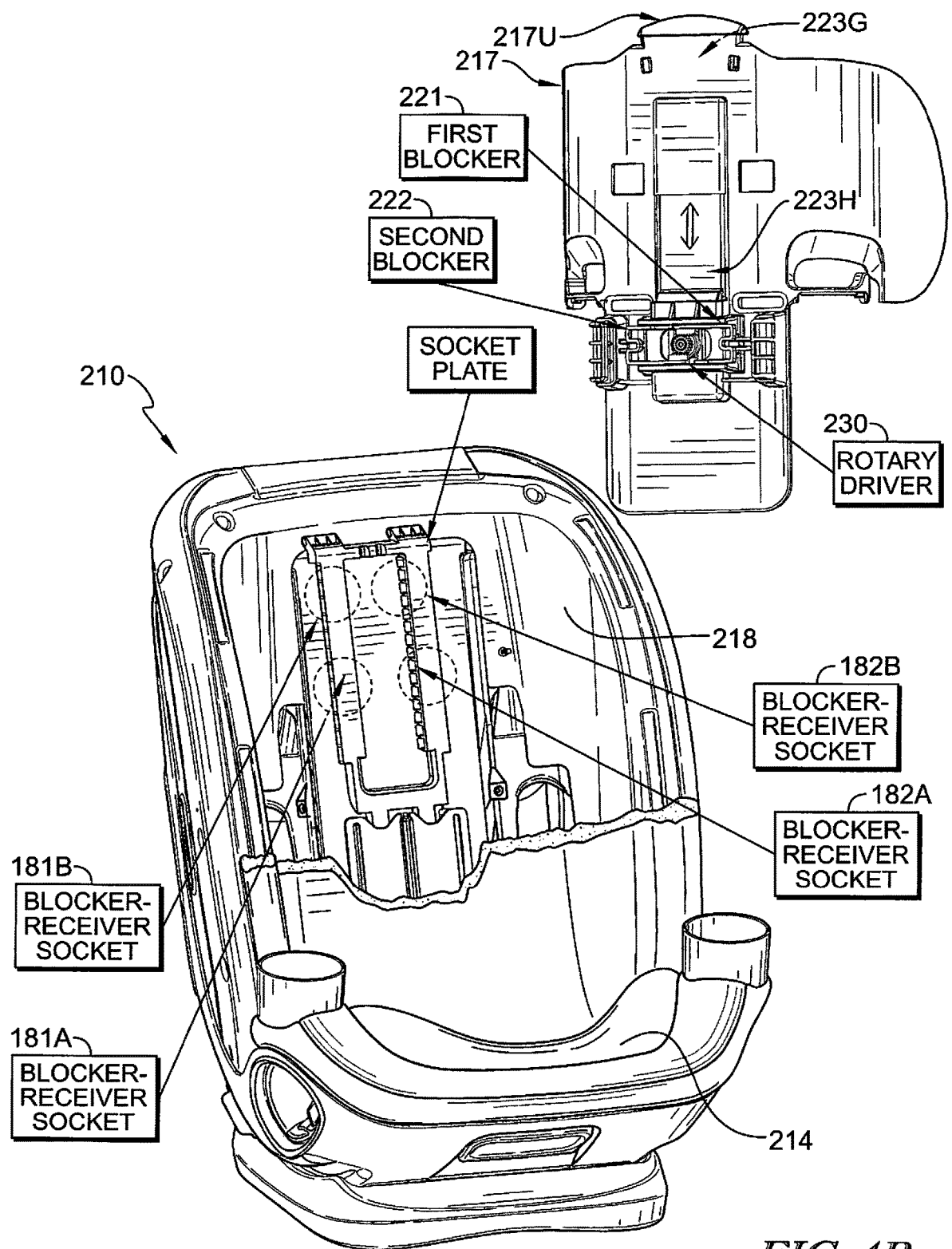
Figure 5:
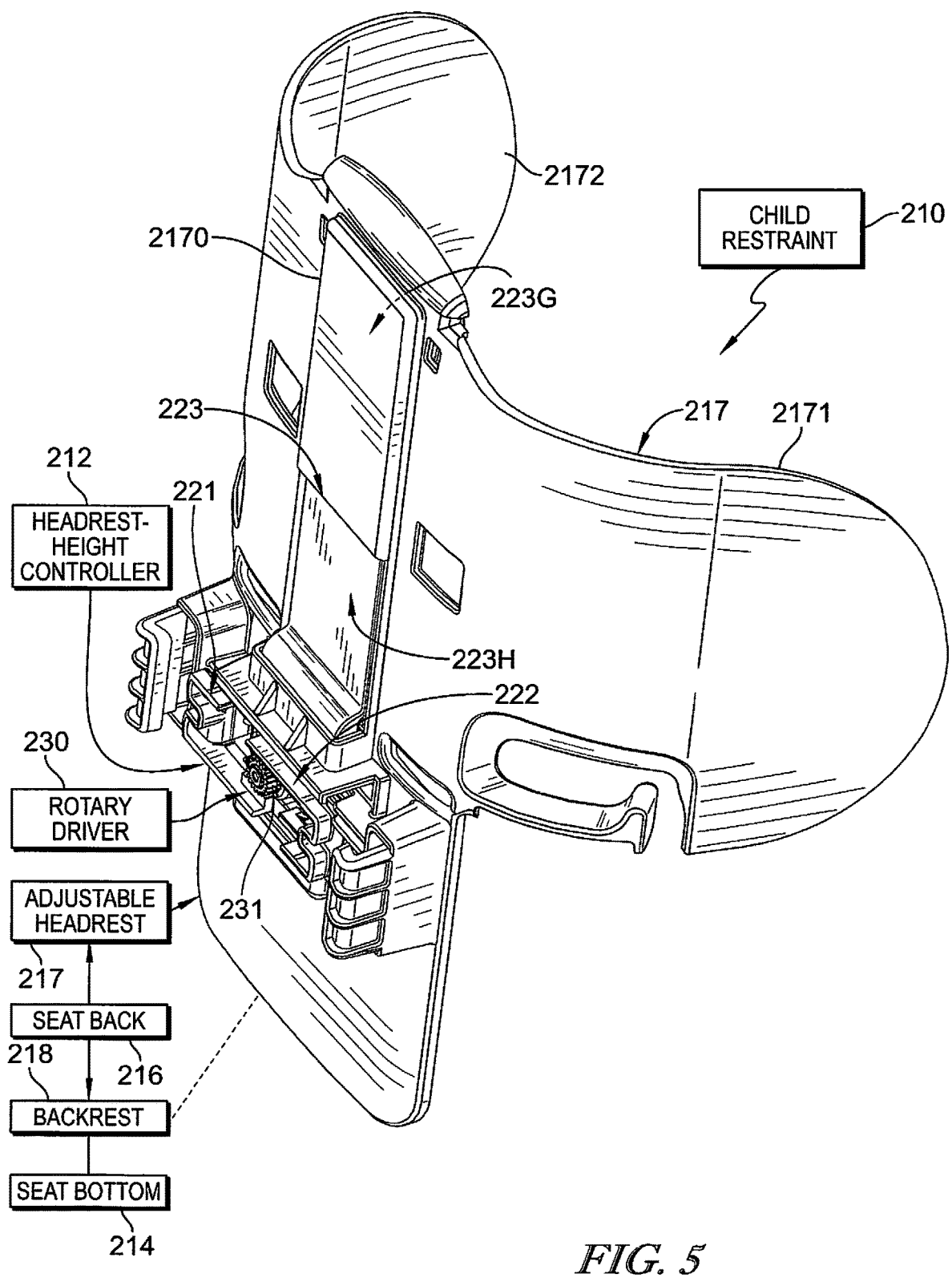
Figure 6:
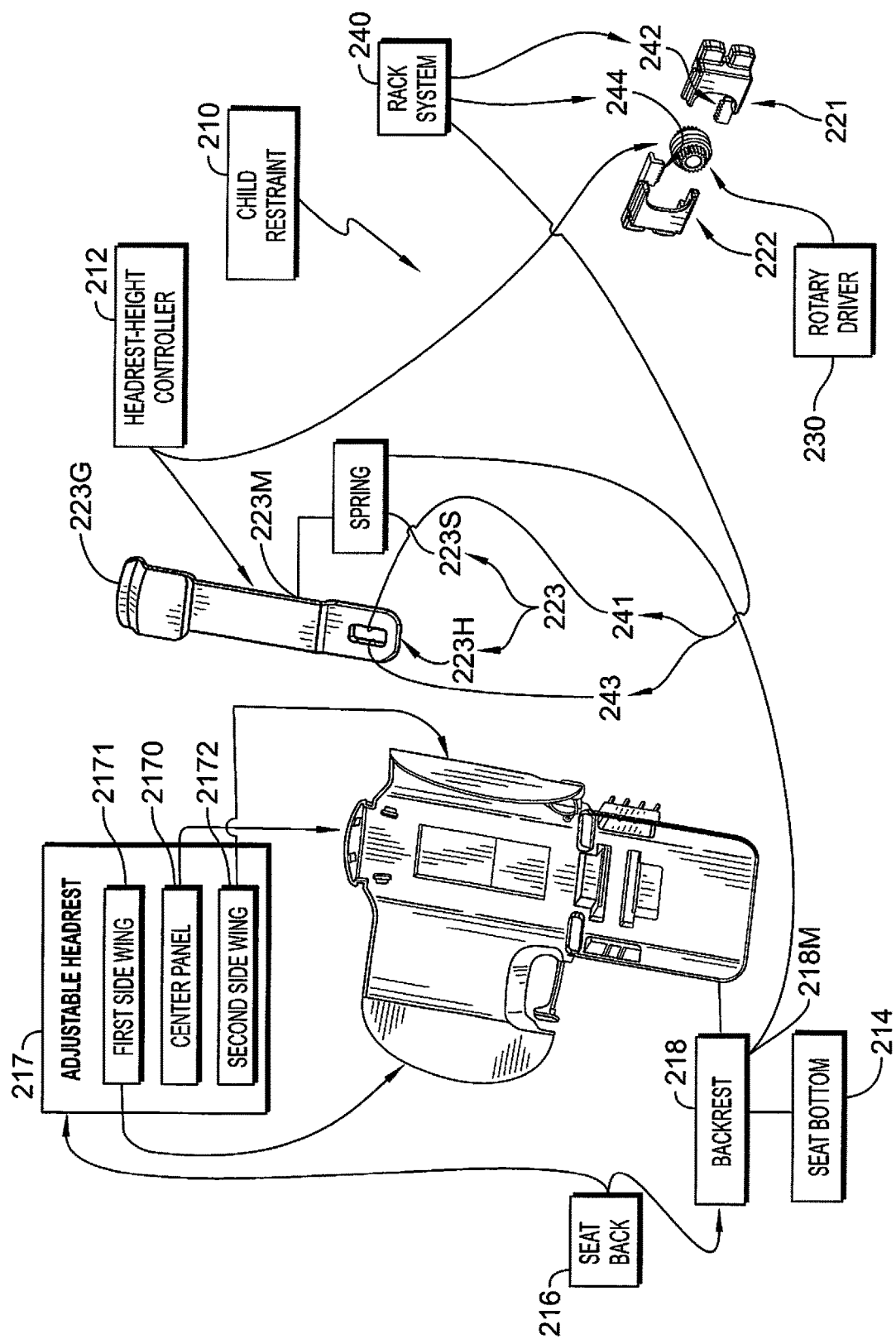
Figure 7:
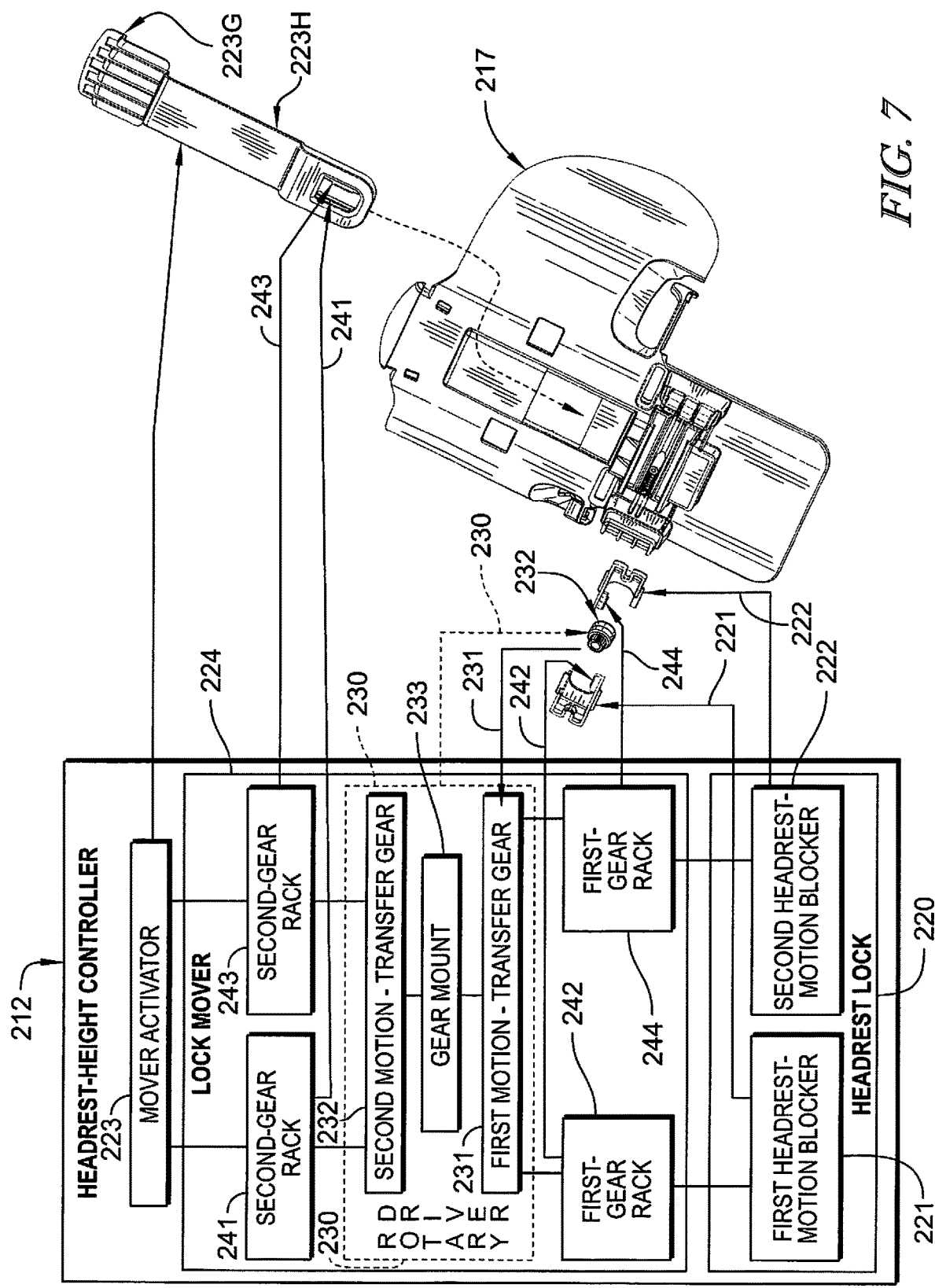
Figure 7A:
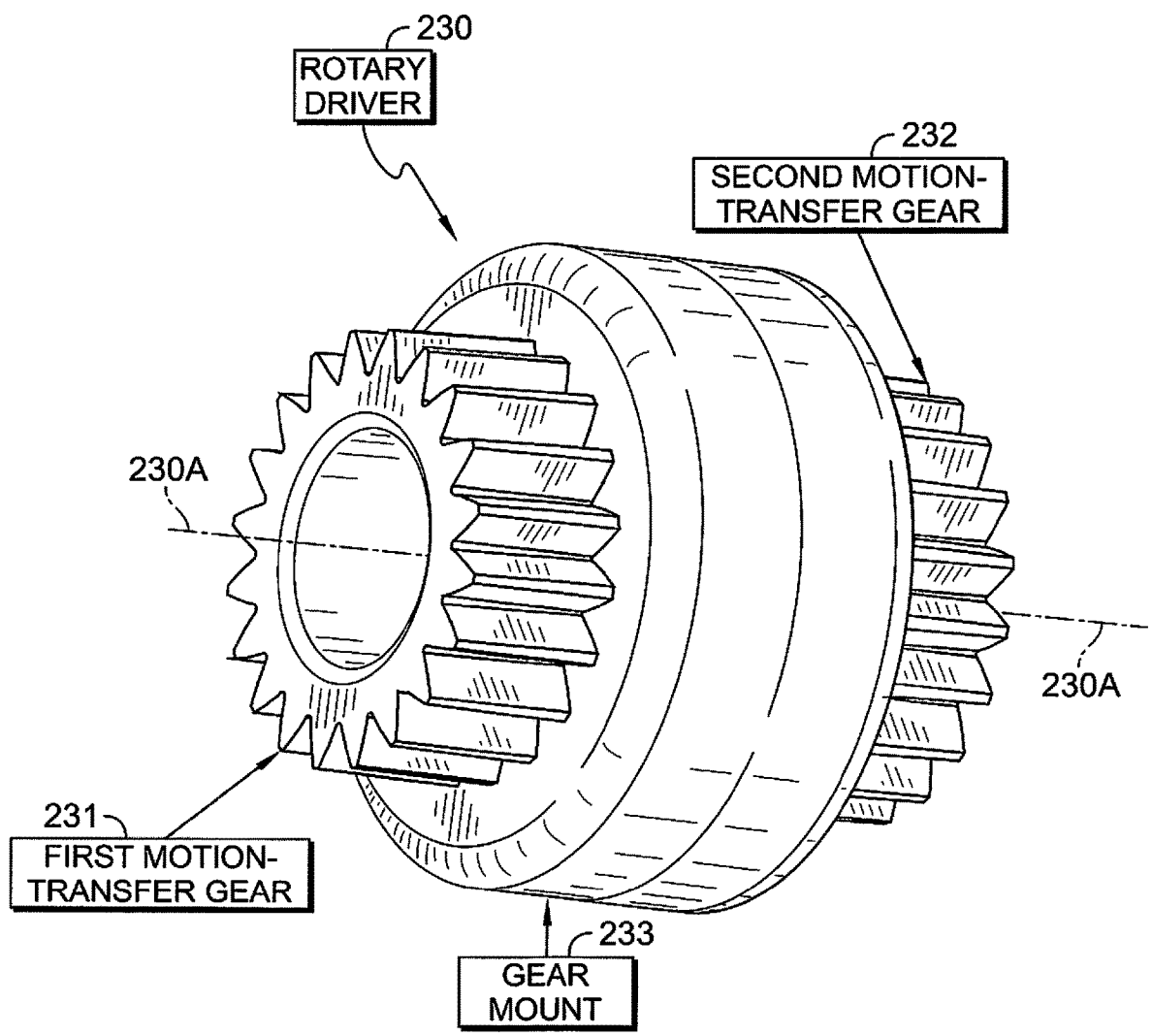
Figure 8:
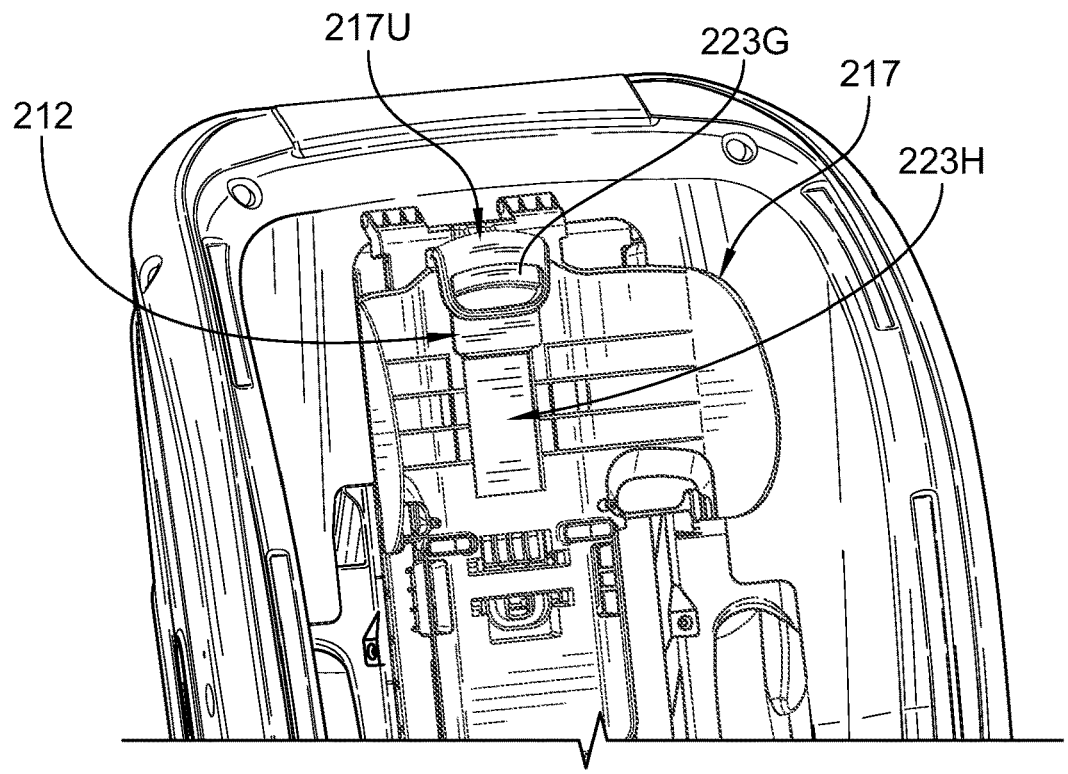
Figure 8A:
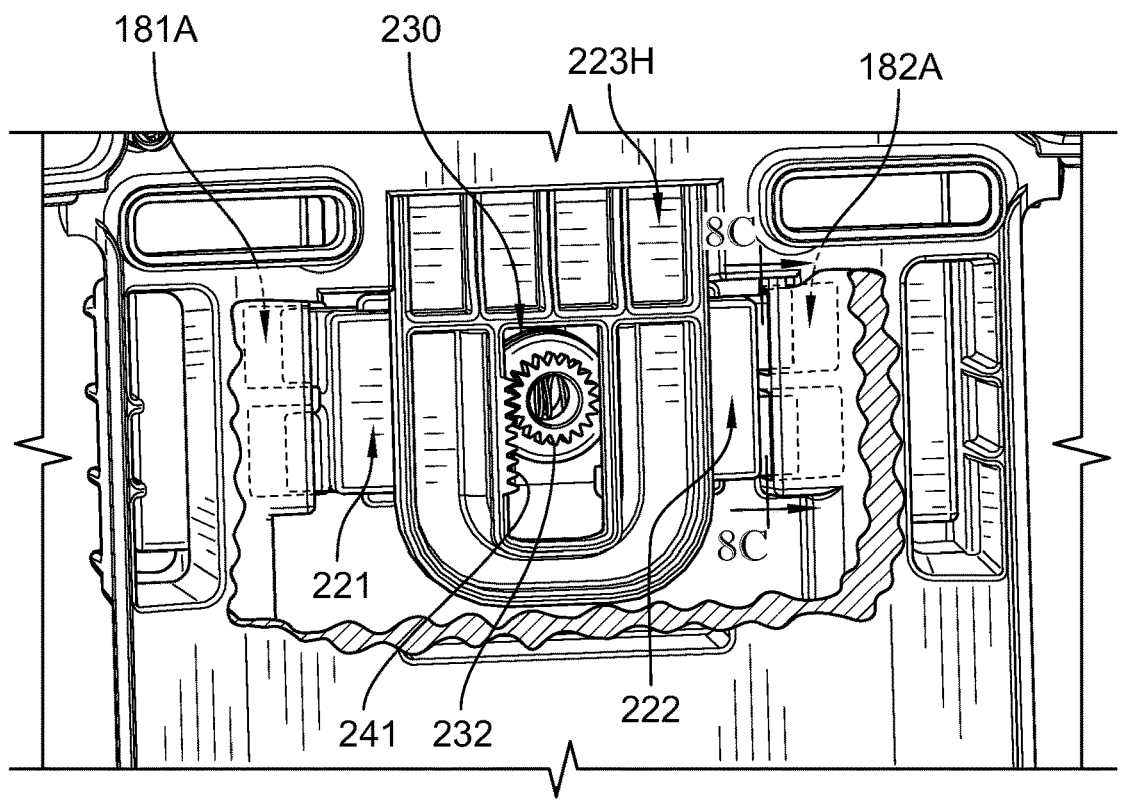
Figure 8B:
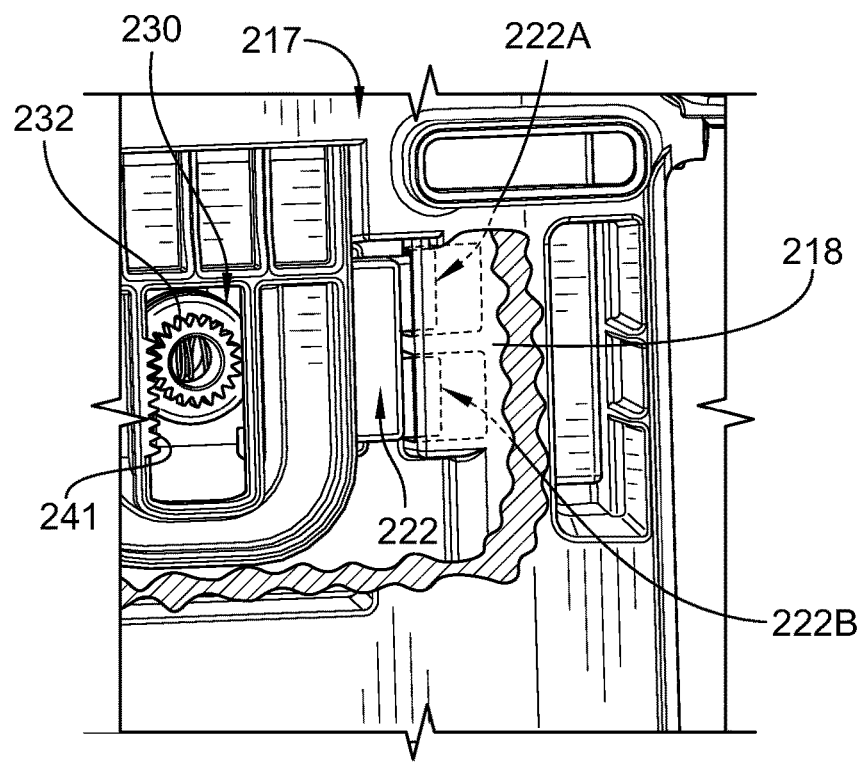
Figure 8C:
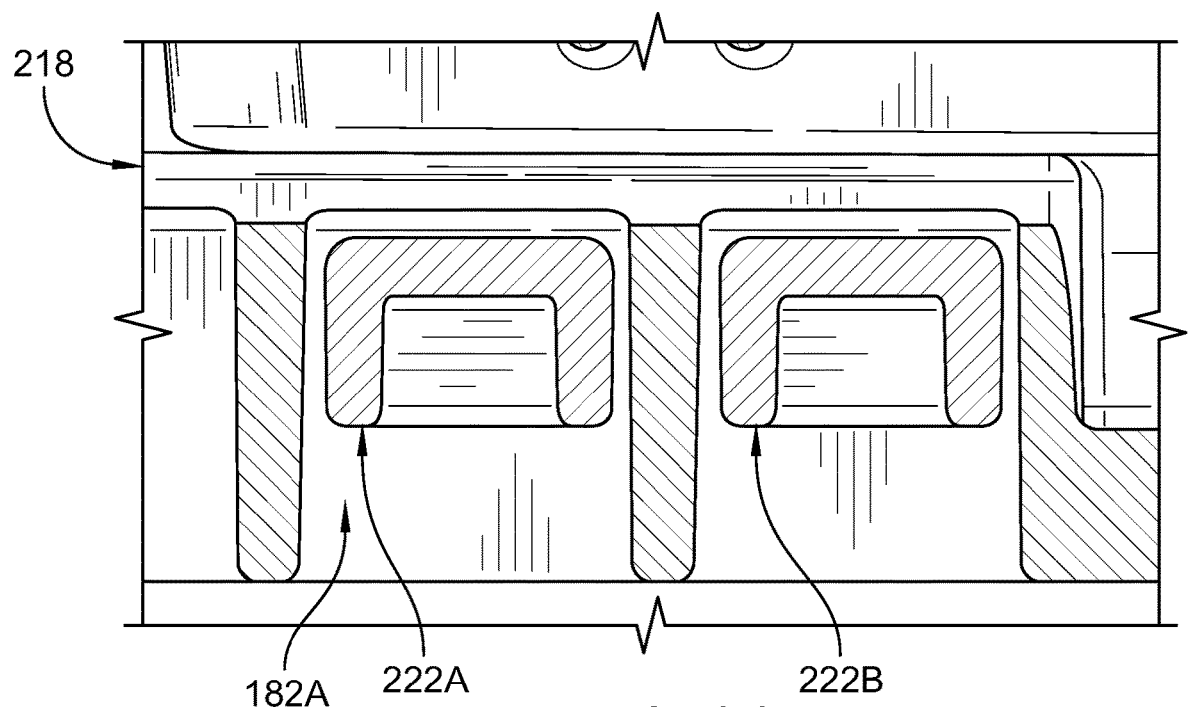
Figure 9:
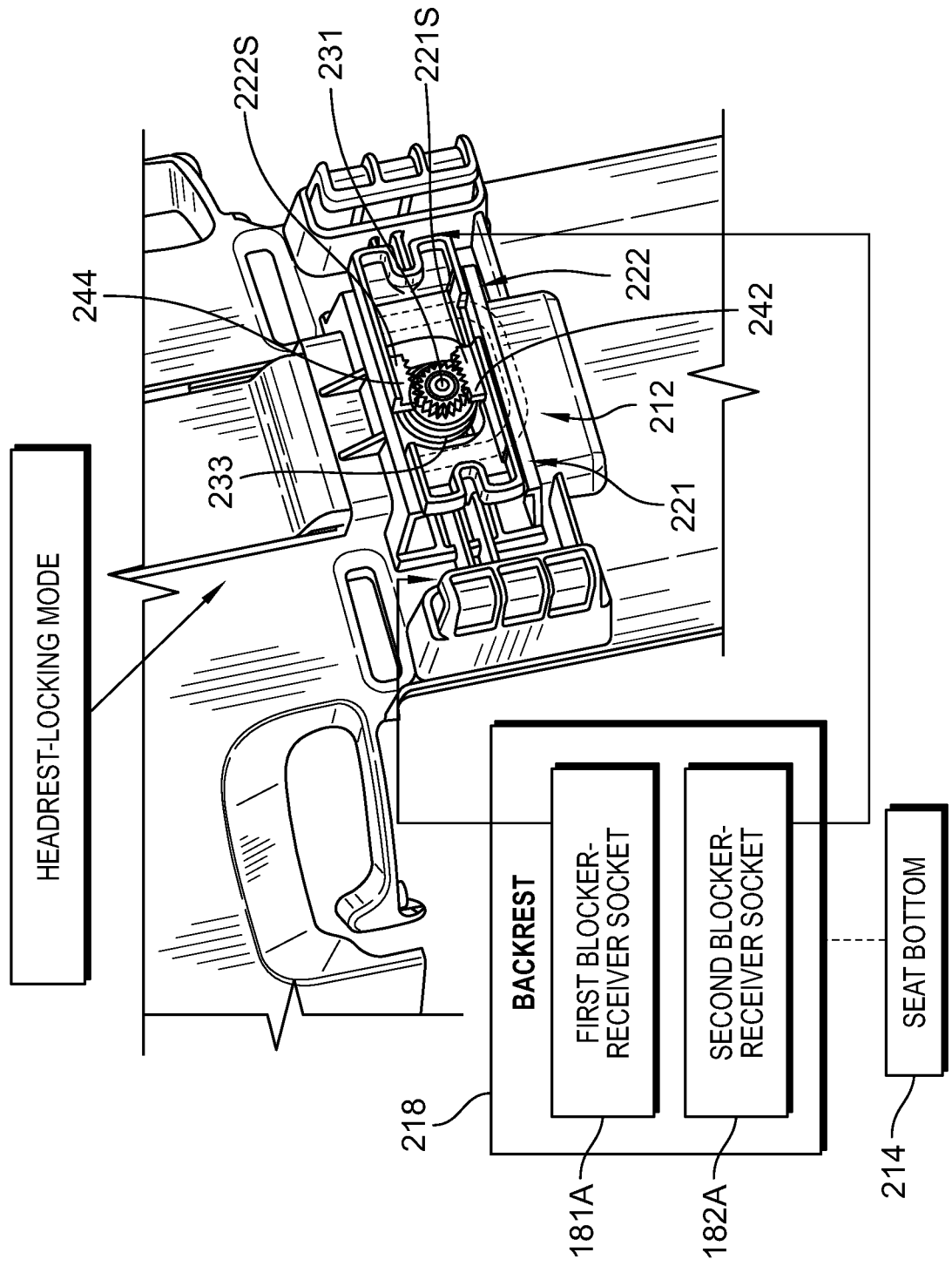
Figure 10:
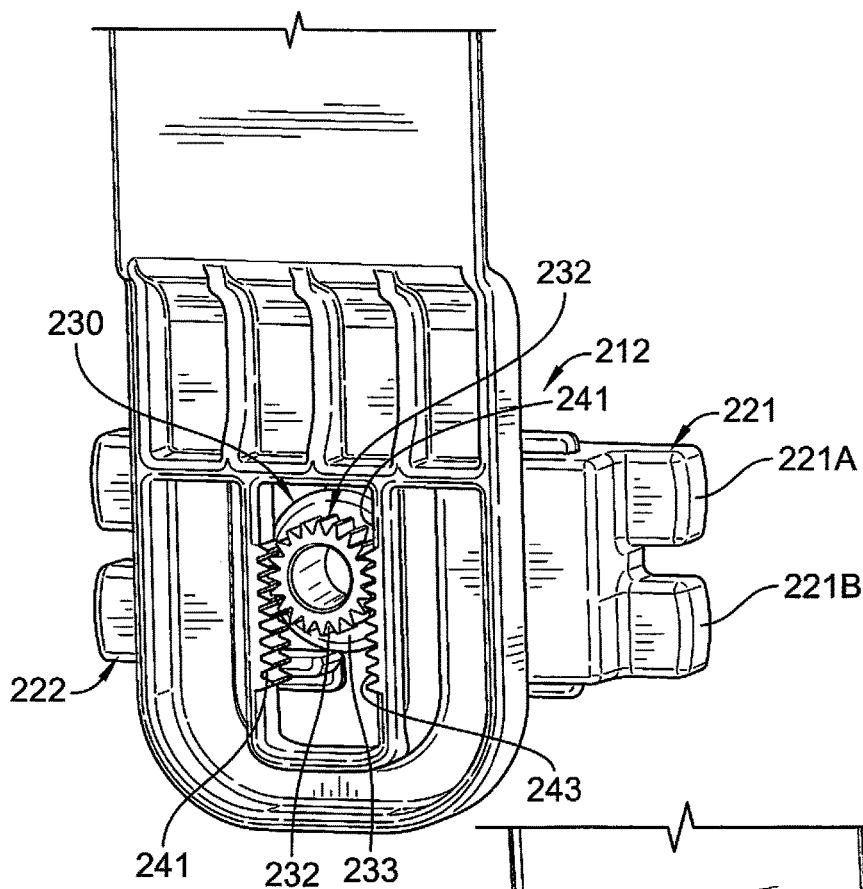
Figure 11:
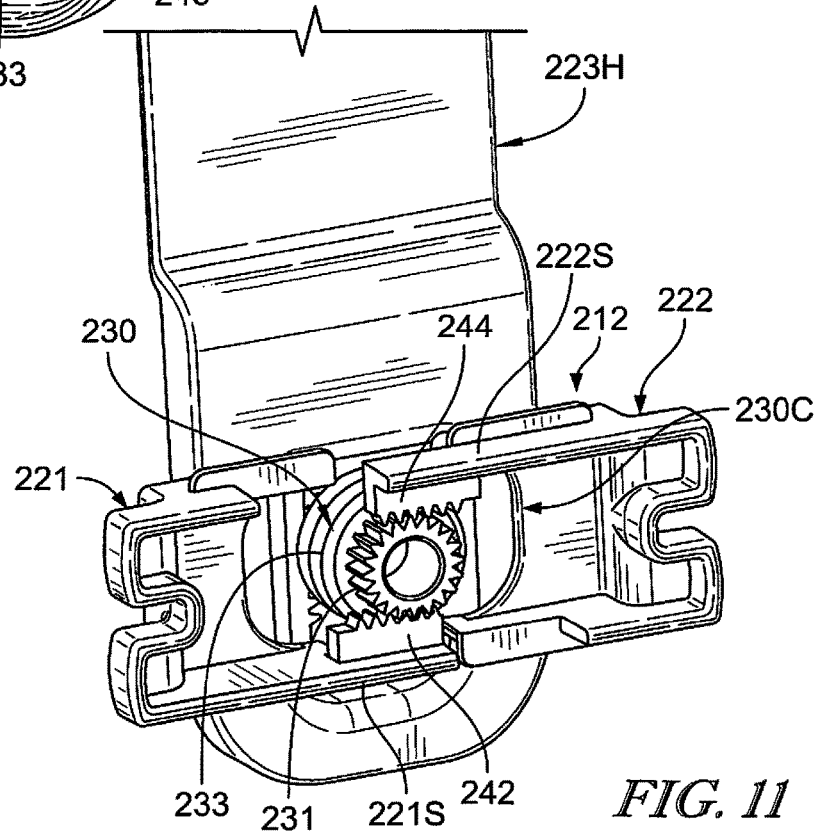
Figure 12:
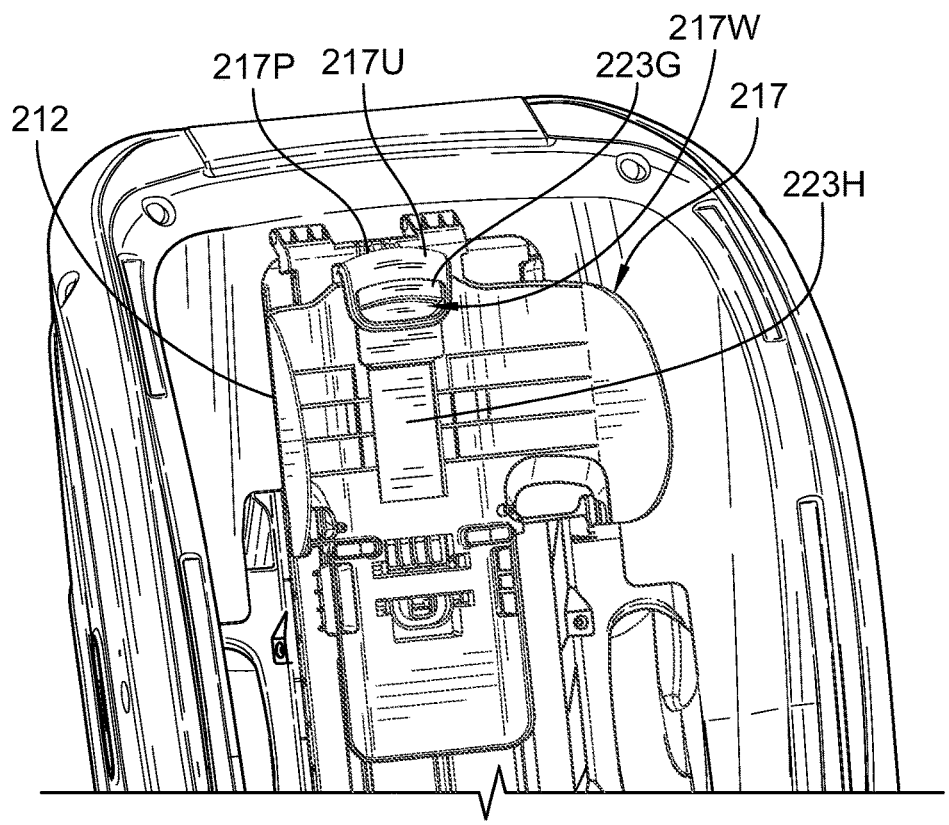
Figure 12A:
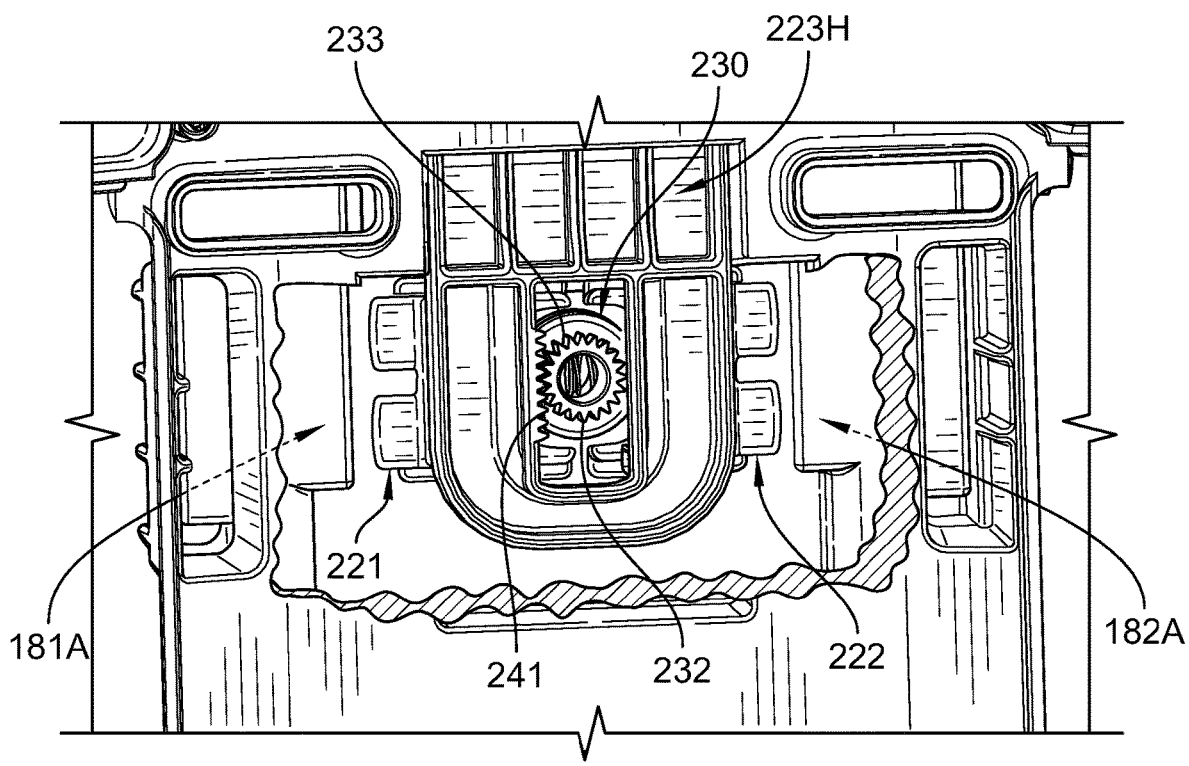
Figure 13:
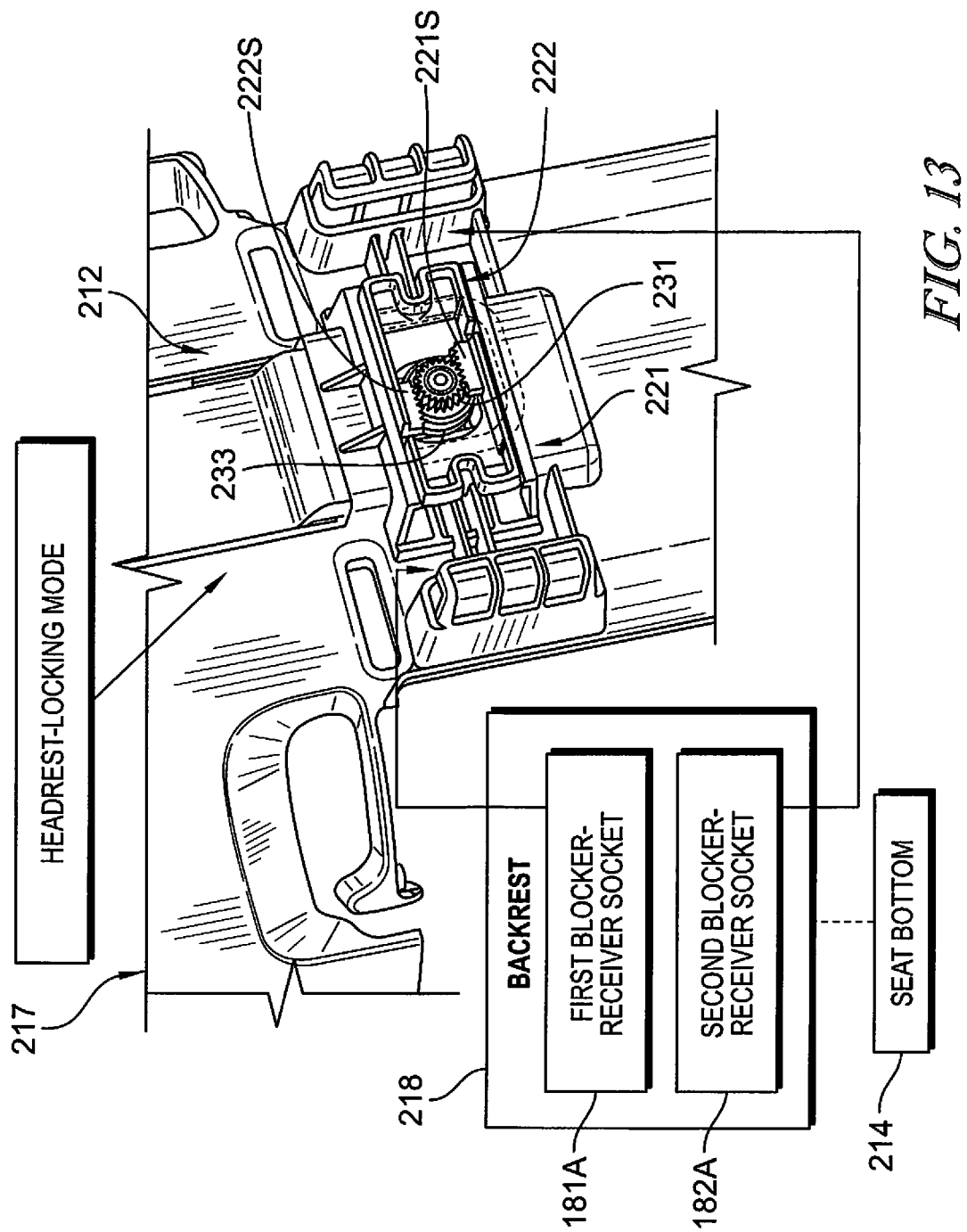
Figure 14:
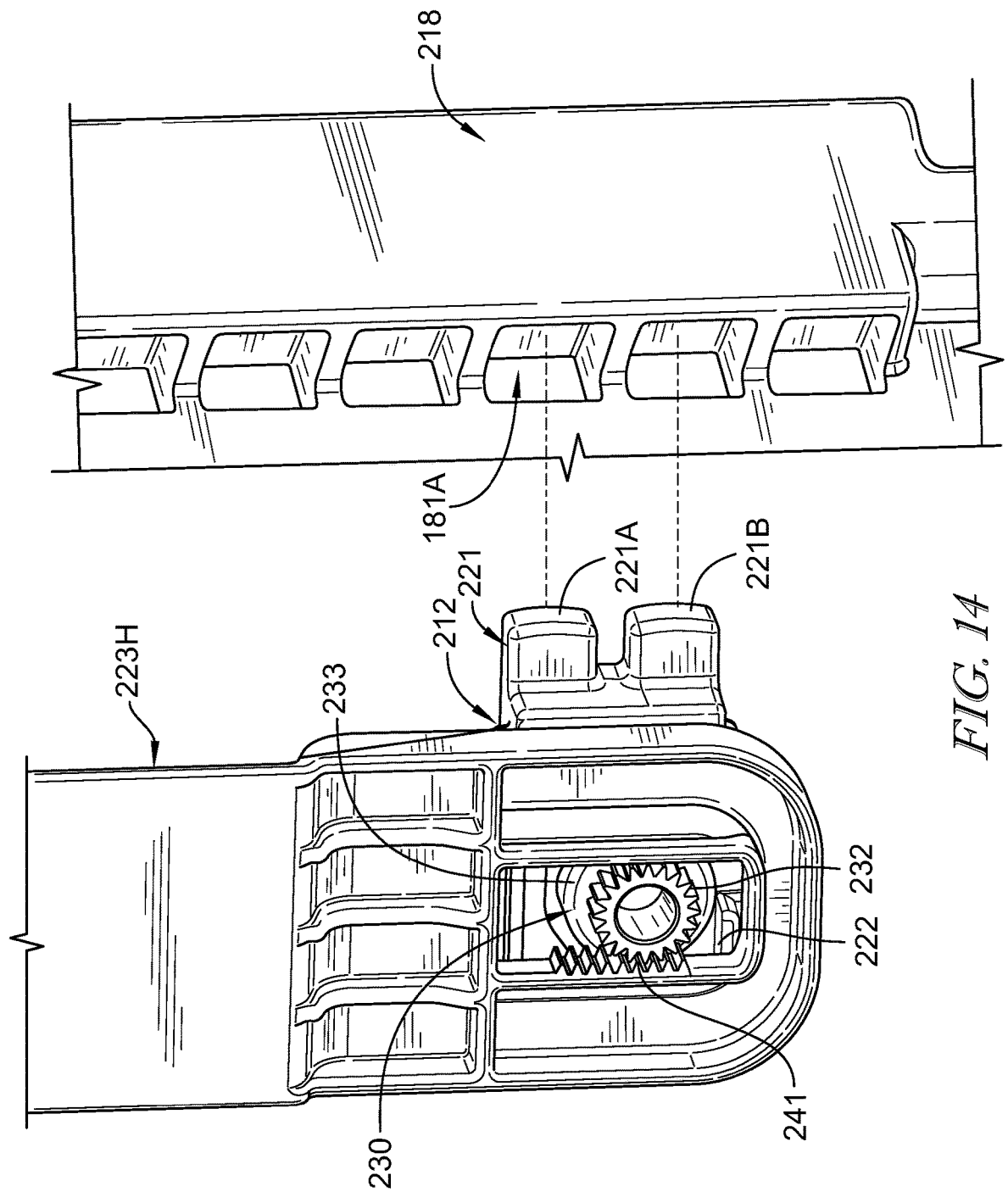
Figure 15:
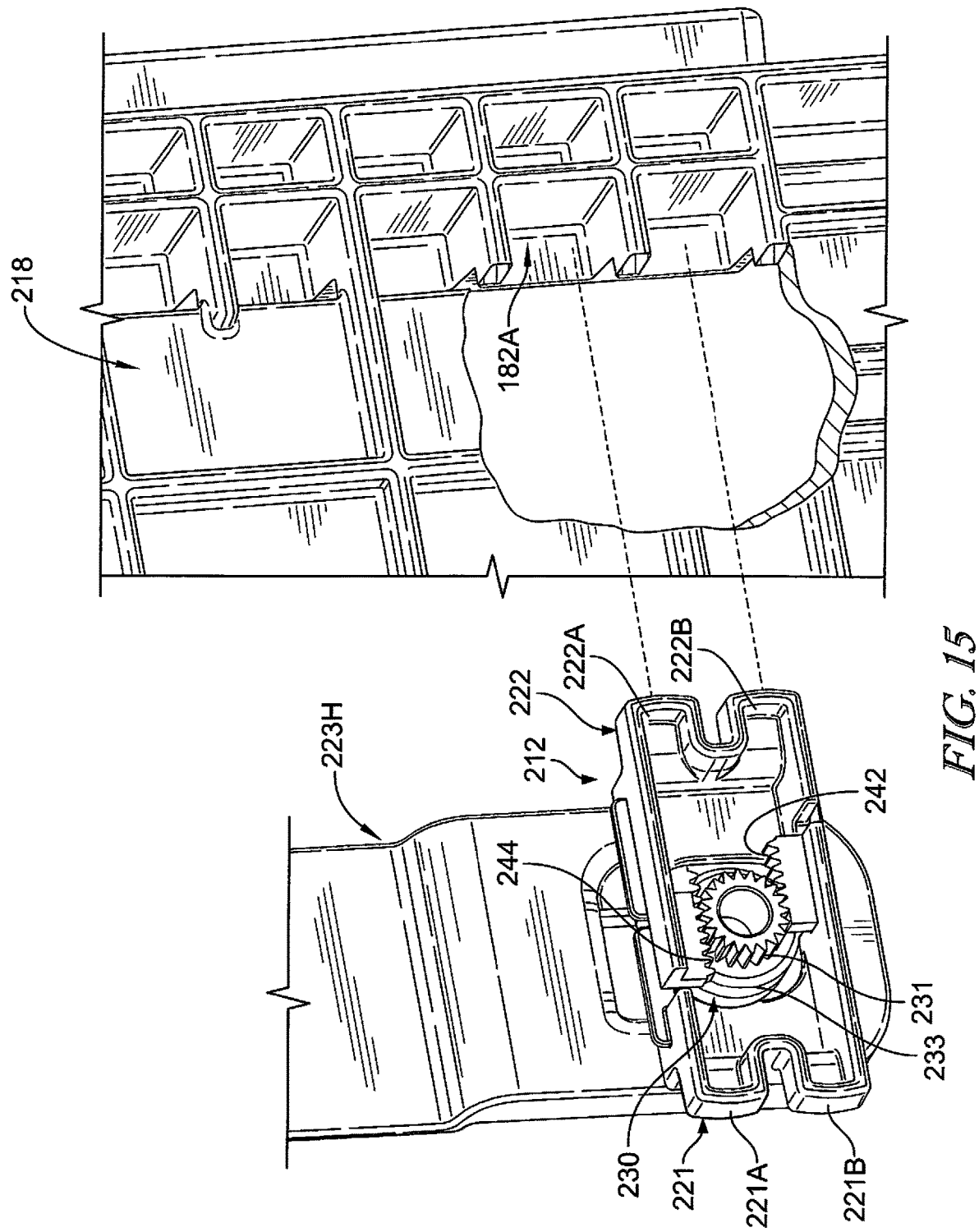
Figure 16:
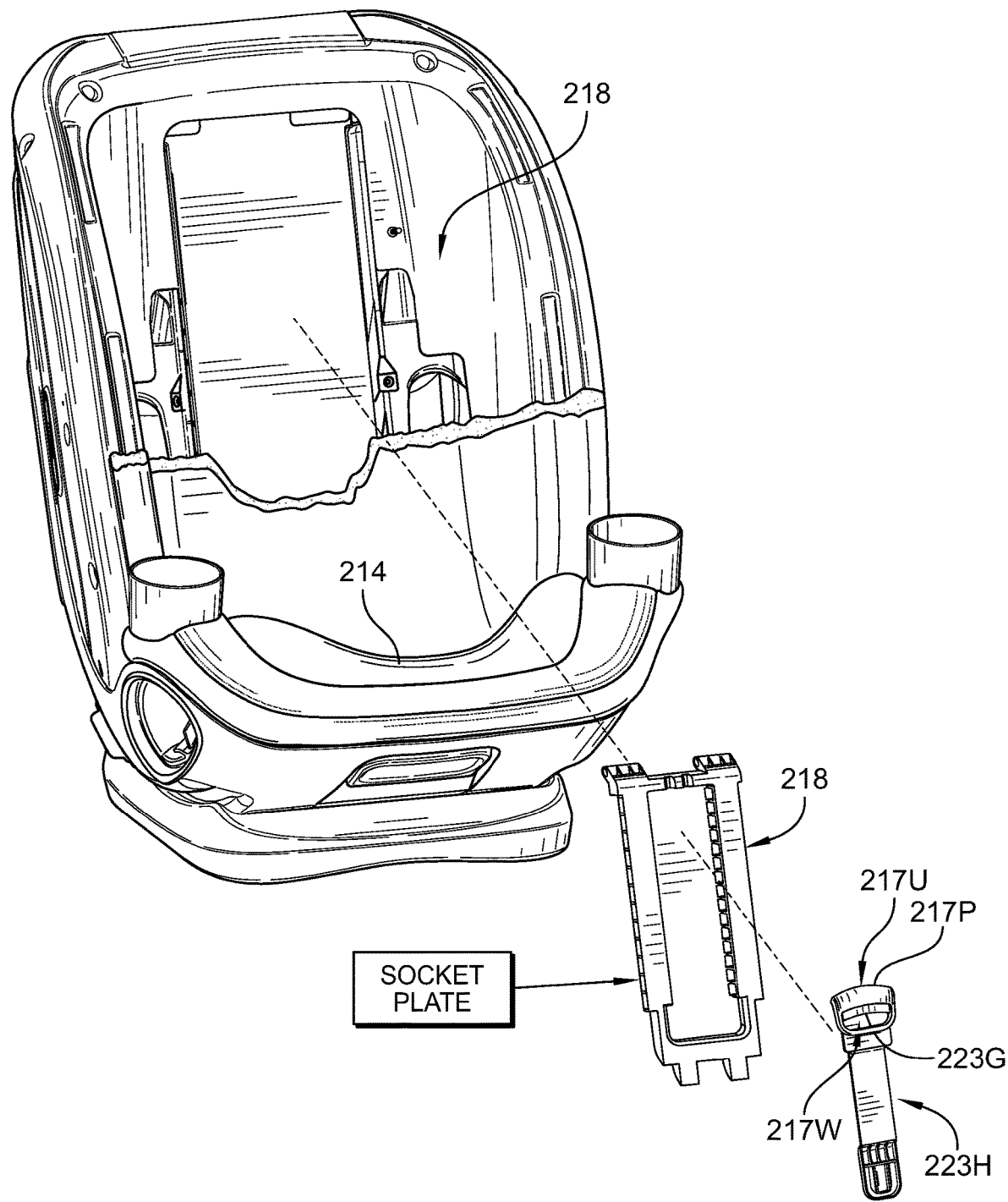
Figure 17:
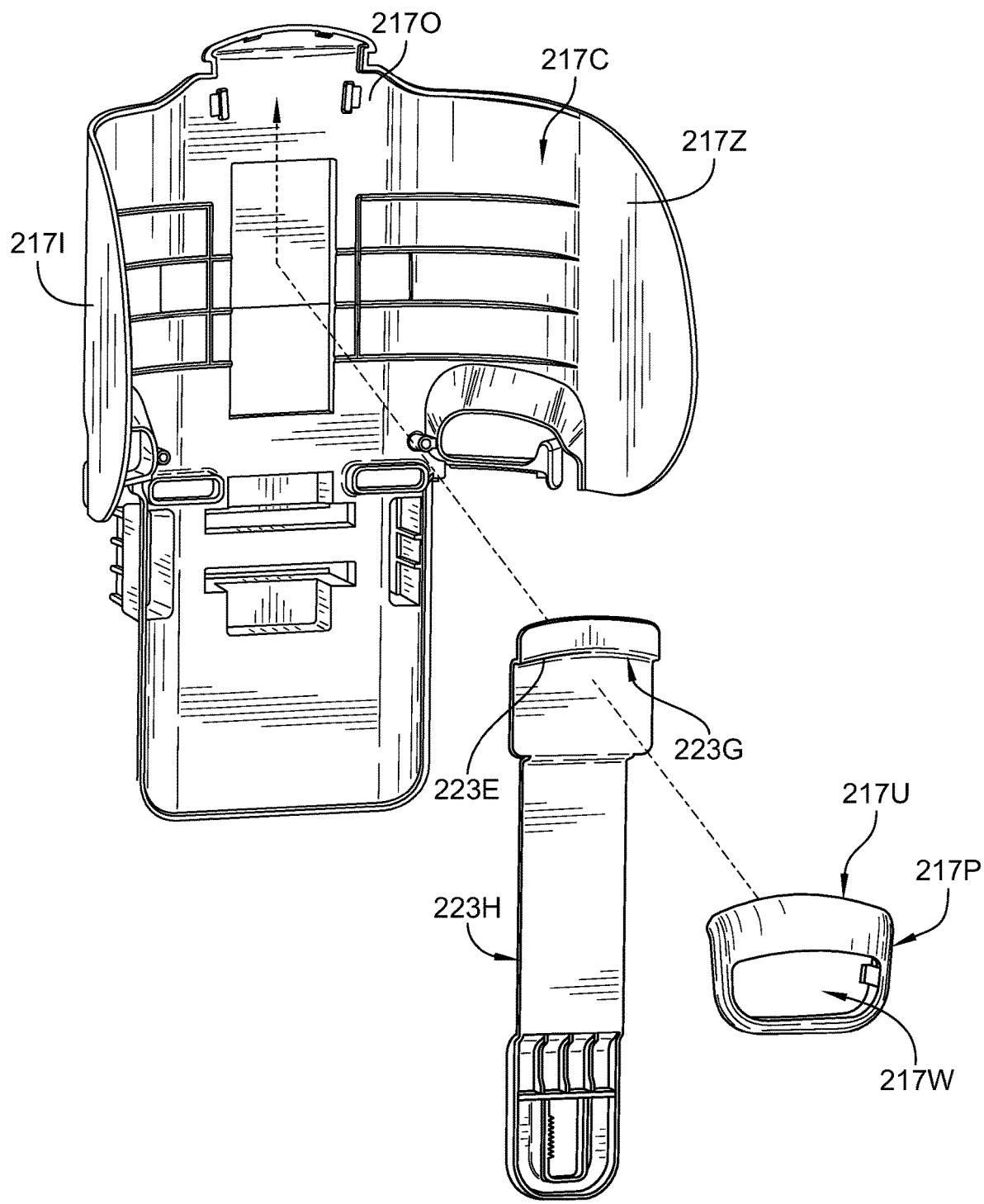

(1) the first motion-transfer gear of the rotary driver to rotate about the first axis of rotation in a counterclockwise direction owing to meshing engagement with one first-gear rack coupled to a first side of the activation handle to cause the first headrest-motion blocker to slide to the right and exit the first blocker-receiver socket owing to meshing engagement of the first motion-transfer gear with another first-gear rack coupled to a topside of the first headrest-motion blocker and (2) the second motion-transfer gear of the rotary driver to rotate about the separate second axis of rotation in a clockwise direction owing to meshing engagement with one second-gear rack coupled to an opposite second side of the activation handle to cause the second headrest-motion blocker to slide to left and exit the second blocker-receiver socket owing to meshing engagement of the second motion-transfer gear with another second-gear rack coupled to a topside of the second headrest-motion blocker so that a HEADREST-UNLOCKING mode of the headrest-height controller is established and the adjustable headrest is free to be raised or lowered on the backrest by the caregiver to a new headrest elevation position relative to the seat bottom;

FIG. 3A is a diagrammatic perspective view of a child restraint comprising a seat bottom, a seat back including a backrest and an adjustable headrest that is mounted for up-and-down movement on the backrest, and a headrest-height controller that moves up and down with the adjustable headrest and suggesting that the headrest-height controller includes a headrest lock, a lock mover, and a lock-mover activator that extends upwardly behind the headrest and showing that a handgrip included in the lock-mover activator is exposed above a front side of the adjustable headrest and that the adjustable headrest is retained in a LOWERED position on the backrest by the headrest-height controller when the headrest-height controller is in a HEADREST-LOCKING mode;

FIG. 3B is a diagrammatic view similar to FIG. 3A showing the adjustable headrest in a RAISED position on the backrest after a caregiver has moved the activation handle upwardly to unlock a locking mechanism included in the headrest-height controller to change the headrest-height controller to a HEADREST-UNLOCKING mode so as to free the headrest to be moved upwardly to the RAISED position until the locking mechanism re-engages the backrest to re-establish a HEADREST-LOCKING mode of the headrest-height controller;

FIG. 3C is a diagrammatic perspective view of the child restraint of FIGS. 3A and 3B showing a headrest-height controller in accordance with a first embodiment of the present disclosure and suggesting that upward movement of an activation handle included in the lock-mover activator functions first to rotate first and second motion-transfer gears included in a lock mover about a common axis rotation in a first direction to withdraw first and second headrest-motion blockers included in the headrest lock from opposing lower sockets formed in the backrest to convert the headrest-height controller to the HEADREST-UNLOCKING mode and suggesting that the adjustable headrest is now free to be moved along with the activation handle upwardly away from the seat bottom by a caregiver from the LOWERED position shown in FIG. 3A to the RAISED position shown in FIG. 3B at which point the first and second headrest-motion blockers can be moved away from one another to extend into the opposing upper sockets formed in the backrest to re-establish the HEADREST-LOCKING mode of the headrest-height controller and to retain the headrest in the RAISED position;

FIG. 4A is a perspective view of an illustrative child restraint including a headrest-height controller in accordance with a second embodiment of the present disclosure and showing that: (1) the activation handle of the mover activator of the headrest-height controller is mounted for up-and-down sliding movement relative to the backrest and to the adjustable headrest, (2) an upper portion of the adjustable headrest is formed to include a forward-facing handgrip window that will be visible to a caregiver facing toward a front side of the adjustable headrest, and (3) an upper end of the activation handle includes a handgrip that has a downwardly facing bottom edge that is adapted to be engaged by fingertips of the caregiver and that is exposed in the forward-facing handgrip window to be seen and touched by the caregiver when the activation handle is urged downwardly to a lowered position by a return spring shown diagrammatically in FIG. 6;

FIG. 4B is a perspective view similar to FIG. 4A after removal of the adjustable headrest and the headrest-height controller from the backrest and suggesting that several sets of opposing blocker-receiver sockets are formed in the backrest and that each set is located at a predetermined elevation above the seat bottom and suggesting that the headrest-height controller includes a rotary driver that is interposed between and connected to horizontally slidable first and second headrest-motion blockers and is connected to a lower portion of a vertically slidable activation handle as suggested in FIGS. 7, 8A, and 10;

FIG. 5 is a diagrammatic view of the child restraint of FIGS. 4A and 4B and includes an illustrative rear perspective view of an adjustable headrest and of a headrest-height controller that is mounted on a center panel of the adjustable headrest for up-and-down movement therewith relative to the backrest;

FIG. 6 is a diagrammatic view of a child restraint including a front exploded perspective assembly view of the adjustable headrest and the headrest-height controller of FIG. 5 showing that the adjustable headrest includes a center panel flanked by oppositely extending first and second side wings and suggesting that the headrest-height controller is adapted to be mounted on the center panel of the adjustable headrest as shown in FIG. 5 and showing that the headrest-height controller includes a rotary driver interposed between two slidable headrest-motion blockers;

FIG. 7 is an illustrative rear perspective view of the adjustable headrest of FIG. 5 showing that the headrest-height controller includes a headrest lock, a headrest-lock mover, and a mover activator and suggesting that (1) the headrest lock includes slidable first and second headrest-motion blockers, (2) the headrest-lock mover provides a rack-and-pinion system that includes a first-gear rack on each of the first and second headrest-motion blockers, two second-gear racks on the activation handle included in the mover activator, and a rotary driver having a first motion-transfer gear engaging the two first-gear racks associated with the headrest-motion blockers and a second motion-transfer gear engaging the two second-gear racks associated with the activation handle, and (3) the activation handle of the mover activator can be gripped at an upper end thereof by a caregiver and moved upwardly relative to the backrest and the headrest to activate the rack-and-pinion system in the headrest-lock mover;

FIG. 7A is an enlarged perspective view of the rotary driver of FIG. 7 showing that the rotary driver includes a first motion-transfer gear on the left, a second motion-transfer gear on the right, and a cylinder-shaped gear mount arranged to lie between and interconnect the two motion-transfer gears so that they will rotate in the same direction about a common axis of rotation;

FIG. 8 is a front perspective view of the adjustable headrest and the headrest-height controller of FIGS. 5-7 mounted on the backrest and showing the headrest-height controller in a HEADREST-LOCKING MODE to block up-and-down movement of the headrest relative to the adjacent headrest-supporting backrest so that a selected headrest elevation position of the adjustable headrest relative to an underlying seat bottom is established;

FIG. 8A is an enlarged rear view of a portion of the child restraint shown in FIG. 8 showing engagement of the rotary gear with gear racks included in the activation handle and suggesting that the first headrest-motion blocker (on the left) is extended outwardly by the rotary driver into a companion blocker-receiver socket formed in the backrest and that the second headrest-motion blocker (on the right) is extended outwardly by the rotary driver into a companion blocker-receiver socket formed in the backrest when the headrest-height controller is placed in the HEADREST-LOCKING MODE;

FIG. 8B is a view similar to FIG. 8A with portions broken away to show the two outwardly projecting cantilevered tabs of the second headrest-motion blocker in companion blocker-receiver sockets;

FIG. 8C is an enlarged sectional view taken along line 8C-8C of FIG. 8A showing that each of the cantilevered tabs is extended into a companion socket formed in the backrest in the HEADREST-LOCKING MODE of headrest-height controller;

FIG. 9 is an enlarged rear elevation view of a portion of the assembly shown in FIG. 8 showing that the first and second motion-transfer gears of the rotary driver included in the headrest-lock mover of the headrest-height controller has been rotated about a common axis of rotation by the activation handle of the mover activator to move the first and second headrest-motion blockers laterally away from one another to extend into companion opposing blocker-receiver sockets (illustrated diagrammatically) formed in the adjacent headrest-supporting backrest when the headrest-height controller is placed in HEADREST-LOCKING MODE;

FIG. 10 is an enlarged front perspective view of a lower portion of the headrest-height controller of FIGS. 5-9 showing the first and second headrest-motion blockers in their motion-blocking extended positions and showing extension of a forward-facing first motion-transfer gear of the rotary driver into a driver-receiving slot formed in a lower end of the activation handle and showing meshing engagement of the forward-facing first motion-transfer gear with the two opposing first-gear racks that are coupled to a lower end of the activation handle and arranged to lie in spaced-apart relation to one another so as to help establish a rack-and-pinion driving connection between the activation handle and the first and second headrest-motion blockers;

FIG. 11 is a rear perspective view of the assembly shown in FIG. 10 showing extension of a rearward-facing second motion-transfer gear of the rotary driver into a driver-receiving channel defined between a horizontally extending first rack-support strip included in the first headrest-motion blocker and a horizontally extending second rack-support strip included in the second headrest-motion blocker and showing meshing engagement of the second motion-transfer gear of the rotary driver and (1) one second-gear rack coupled to the first rack-support strip of the first headrest-motion blocker and (2) another second-gear rack coupled to the second rack-support strip of the second headrest-motion blocker and arranged to lie in opposing laterally spaced-apart relation to the one second-gear rack to help establish the rack-and-pinion driving connection between the activation handle and the first and second headrest-motion blockers;

FIG. 12 is a view similar to FIG. 8 showing the headrest-height controller in a HEADREST-UNLOCKING mode to free the headrest for up-and-down movement relative to the adjacent headrest-supporting backrest after the caregiver has gripped a top handle included in the activation handle and raised the activation handle in an upward direction;

FIG. 12A is an enlarged rear view of a portion of the child restraint shown in FIG. 12 showing engagement of the rotary gear with gear racks included in the activation handle and suggesting that the first headrest-motion blocker (on the left) is retracted inwardly by the rotary driver out of a companion blocker-receiver socket formed in the backrest and that the second headrest-motion blocker (on the right) is retracted inwardly by the rotary driver out of a companion blocker-receiver socket formed in the backrest when the headrest-height controller is placed in the HEADREST-UNLOCKING MODE;

FIG. 13 is an enlarged rear elevation view of a portion of the assembly shown in FIG. 12 showing that the rotary driver included in the headrest-lock mover of the headrest-height controller has been rotated about its axis of rotation by the raised activation handle of the mover activator to move the first and second headrest-motion blockers laterally toward one another to exit the companion opposing motion-blocker sockets (illustrated diagrammatically) formed in the adjacent headrest-supporting backrest when the headrest-height controller is placed in HEADREST-UNLOCKING MODE;

FIG. 14 is an enlarged front perspective view similar to FIG. 10 showing the first and second headrest-motion blockers in their motion-allowing retracted positions and suggesting that each of the two outwardly projecting cantilevered tabs included in the first headrest-motion blocker is sized, shaped, and arranged to be extended into a companion blocker-receiver socket formed in the backrest during rotation of the rotary driver about its axis of rotation in response to vertical movement of the activation handle relative to the backrest;

FIG. 15 is a rear perspective view of the assembly shown in FIG. 14 and is similar to FIG. 11 but showing that the rearwardly extending second motion-transfer gear has been rotated as a result of upward movement of the activation handle relative to the backrest to cause the first and second headrest-motion blockers to move laterally toward one another to assume their motion-allowing retracted positions to withdraw the two outwardly projected cantilevered tabs included in the second headrest-motion blocker from companion blocker-receiver sockets formed in the backrest during rotation of the rotary driver about its axis of rotation in response to vertical movement of the activation handle relative to the backrest;

FIG. 16 is an exploded perspective assembly view showing that a socket plate is formed to include many vertically spaced sets of opposing blocker-receiver sockets and configured to be mounted on a shell included in the child restraint and that the activation handle is sized and shaped to fit into the socket plate; and FIG. 17 is an exploded perspective assembly view showing that the adjustable headrest is sized to mate with the activation handle.

DETAILED DESCRIPTION

A child restraint 10 including a headrest-height controller 12 in accordance with a first embodiment of the present disclosure is shown in FIGS. 1A-C and 2A-B while a child restraint 210 including a headrest-height controller 212 in accordance with a second embodiment of the present disclosure is shown in FIGS. 8-15. In each case, the headrest-height controller 12, 212 includes a movable headrest-lock 20, 220 along with a headrest-lock mover 24, 224 that comprises a two-gear rack-and-pinion system in accordance with the present disclosure, which system is used by a caregiver to unlock a companion adjustable headrest included in the child restraint 10 or 210 so that the adjustable headrest can be raised or lowered by the caregiver relative to an underlying seat bottom also included in the child restraint 10 or 210.

In each headrest-height controller embodiment of the present disclosure, a rotary driver comprising two pinion gears is included in the gears-and-pinion system that is used to lock and unlock the headrest lock that is also included in each headrest-height controller 12, 212. As suggested in FIGS. 1C, 2A, and 2B, a rotary driver 30 in headrest-lock mover 24 of the first headrest-height controller 12 comprises a first motion-transfer (pinion) gear 31 mounted to rotate in one direction about a first axis of rotation 31A and a second motion-transfer (pinion) gear 32 mounted to rotate in an opposite direction about a second axis of rotation 32A that is arranged to lie in spaced-apart parallel relation to first axis of rotation 31A. In contrast, as suggested in FIGS. 6, 7, and 7A, a rotary driver 230 in headrest-lock mover 224 of the second headrest-height controller 212 comprises first and second motion-transfer (pinion) gears 231, 232 that are coupled to an intermediate gear mount 233 to rotate always in unison in the same direction about a single (common) axis of rotation 230A.

Figure 2A:
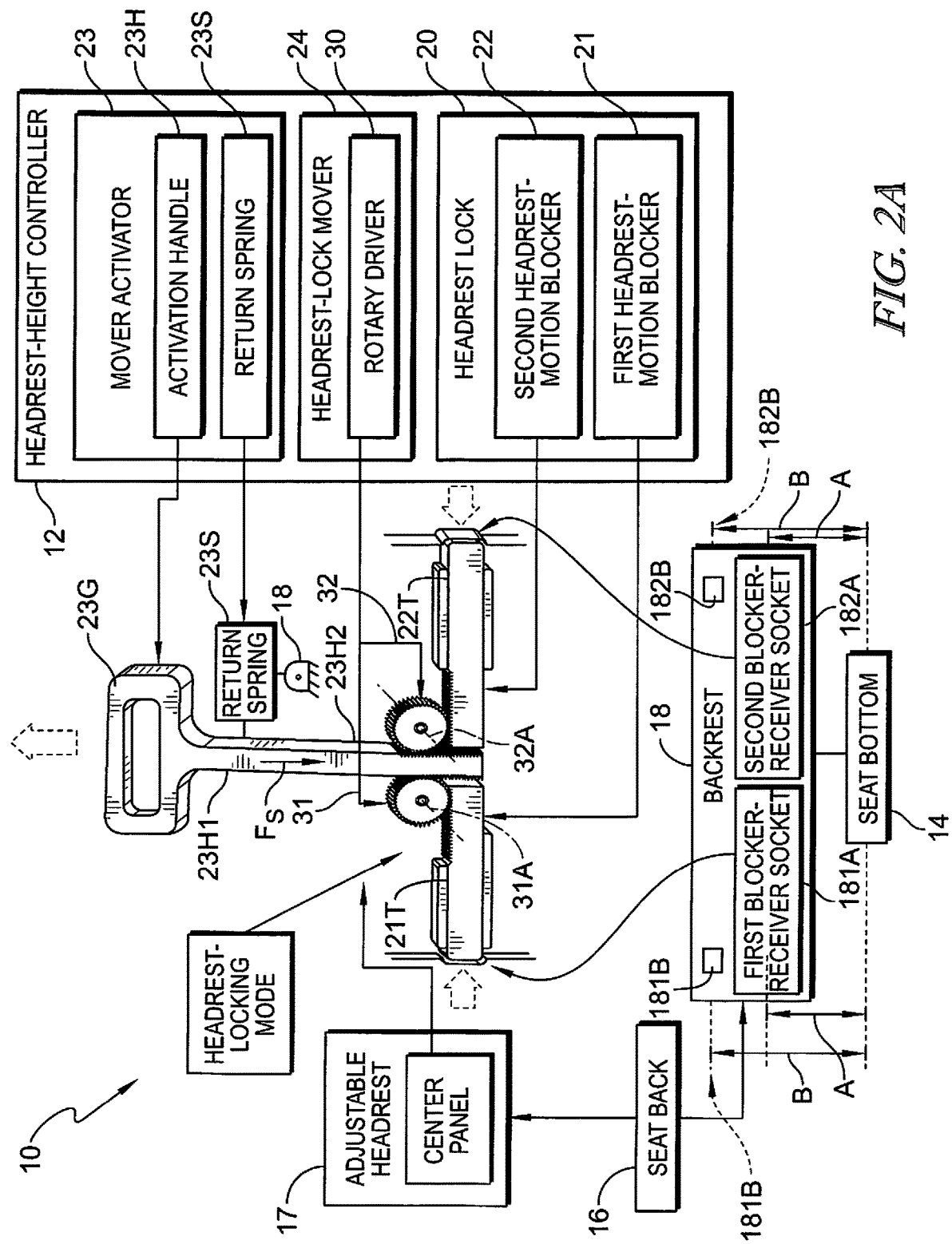
FIG. 2A is a diagrammatic view of a child restraint providing an illustrative view of a headrest-height controller in accordance with the first embodiment of the present disclosure and showing that the headrest-height controller includes a headrest lock, a headrest-lock mover, and a mover activator including a return spring and an activator handle that can be gripped and moved by a caregiver against a biasing force generated by the return spring to actuate the headrest-lock mover to unlock the headrest lock as suggested in FIG. 2B and suggesting that (1) the headrest lock includes laterally movable first and second headrest-motion blockers that are urged normally in opposite directions by the headrest-lock mover and the return spring to extend into opposing first and second blocker-receiver sockets formed in the backrest of the seat back to establish the HEADREST-LOCKING mode of the headrest-height controller to retain the headrest in a selected headrest elevation position above an underlying seat bottom and (2) the headrest-lock mover includes a rack-and-pinion system in accordance with the first embodiment of the present disclosure in which a rotary driver comprising two pinion gears is used to move the headrest-motion blockers into and out of the blocker-receiver sockets in response to up-and-down movement of the activation handle relative to the backrest.

In illustrative embodiments, the headrest of child restraint 10 or 210 is locked on the backrest at a selected headrest elevated position above the companion seat bottom when the headrest-height controller 12 or 212 that is mounted for up-and-down movement with the headrest relative to the backrest is placed by a caregiver in a HEADREST-LOCKING mode as suggested in FIG. 2A and in FIGS. 3, 8, and 9. The headrest of child restraint 10 or 110 is unlocked when the headrest-height controller 12 or 212 is placed by a caregiver in a HEADREST-UNLOCKING mode as suggested in FIG. 2B and in FIGS. 12 and 13.

Figures 1A, 1B:
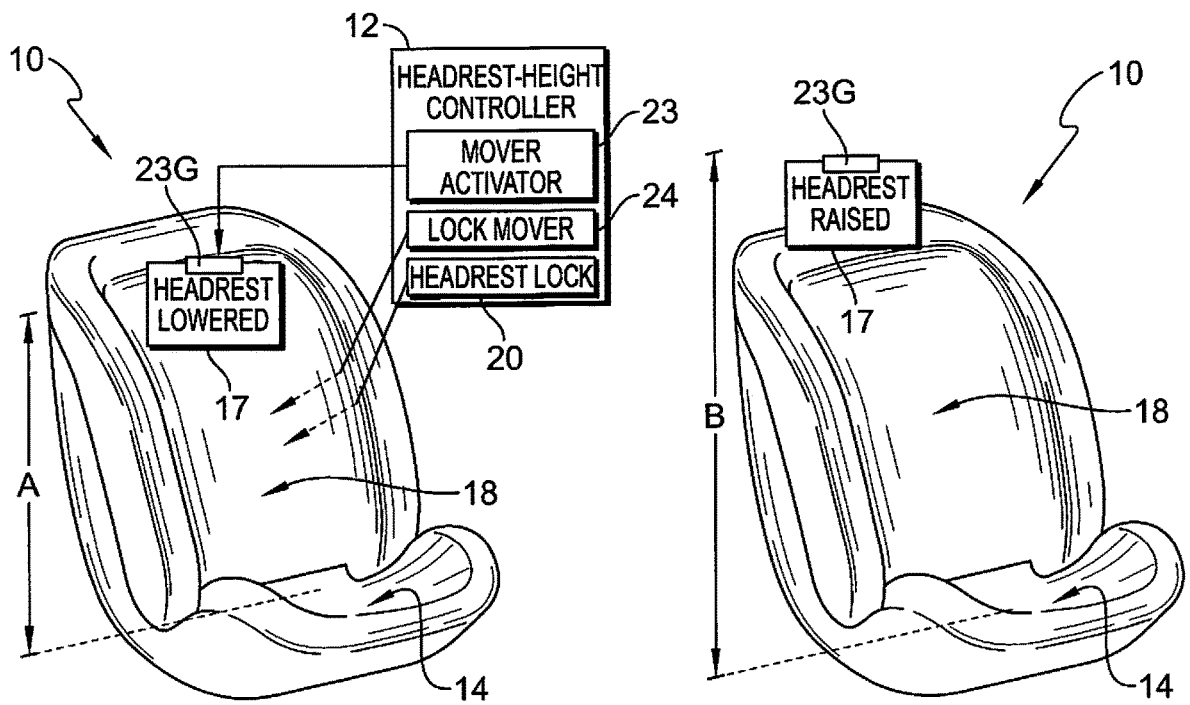
FIG. 1A is a diagrammatic perspective view of a child restraint comprising a seat bottom, a seat back including a backrest and an adjustable headrest that is mounted for up-and-down movement on the backrest, and a headrest-height controller that moves up and down with the adjustable headrest and suggesting that the headrest-height controller includes a headrest lock, a lock mover, and a lock-mover activator that extends upwardly behind the headrest and showing that a handgrip included in the lock-mover activator is exposed above a front side of the adjustable headrest and that the adjustable headrest is retained in a LOWERED position on the backrest by the headrest-height controller when the headrest-height controller is in a HEADREST-LOCKING mode.
FIG. 1B is a diagrammatic view similar to FIG. 1A showing the adjustable headrest in a RAISED position on the backrest after a caregiver has moved the activation handle upwardly to unlock a locking mechanism included in the headrest-height controller to change the headrest-height controller to a HEADREST-UNLOCKING mode so as to free the headrest to be moved upwardly to the RAISED position until the locking mechanism re-engages the backrest to re-establish a HEADREST-LOCKING mode of the headrest-height controller.
Figure 1C:
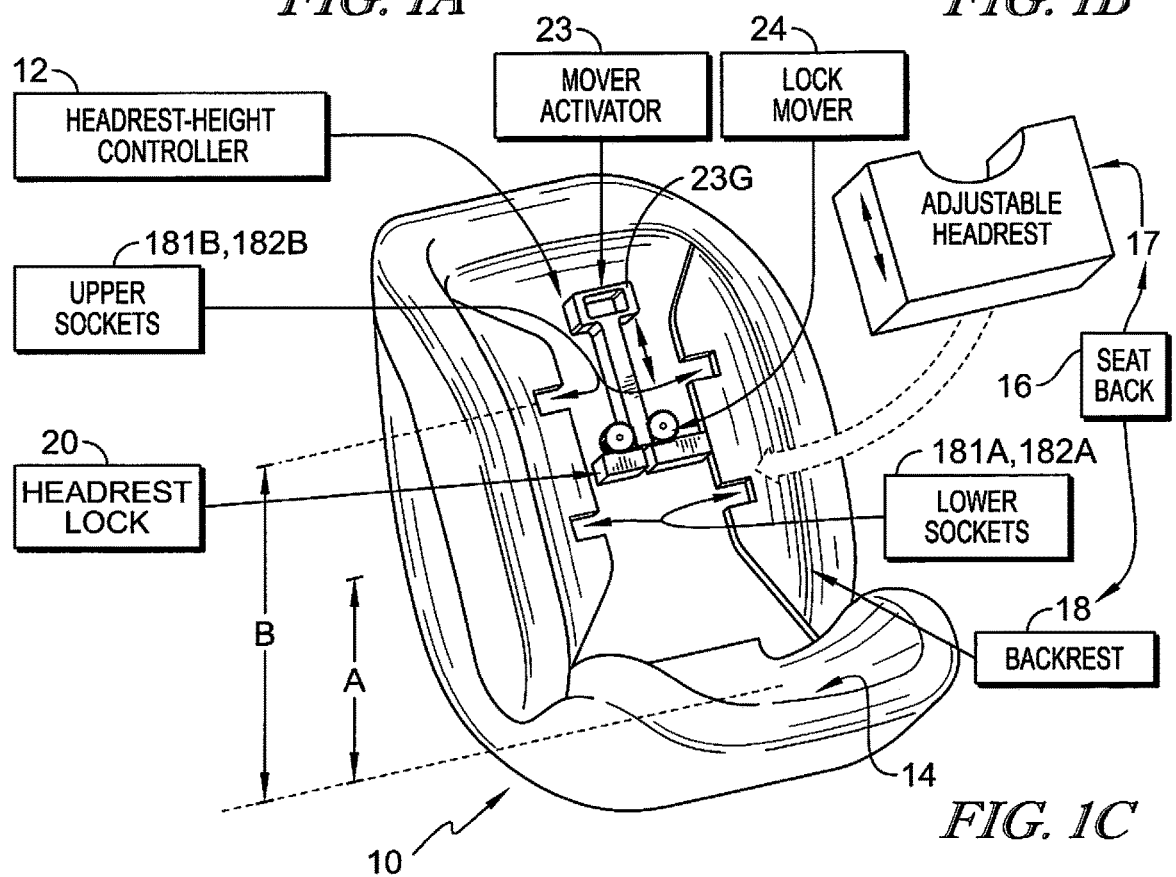
FIG. 1C is a diagrammatic perspective view of the child restraint of FIGS. 1A and 1B showing a headrest-height controller in accordance with a first embodiment of the present disclosure and showing that upward movement of an activation handle included in the lock-mover activator functions first to rotate first and second motion-transfer gears included in a lock mover in opposite directions about separate and parallel axes of rotation to withdraw first and second headrest-motion blockers included in the headrest lock from opposing lower sockets formed in the backrest to convert the headrest-height controller to the HEADREST-UNLOCKING mode and suggesting that the adjustable headrest is now free to be moved along with the activation handle upwardly away from the seat bottom by a caregiver from the LOWERED position shown in FIG. 1A to the RAISED position shown in FIG. 1B at which point the first and second headrest-motion blockers can be moved away from one another to extend into the opposing upper sockets formed in the backrest to re-establish the HEADREST-LOCKING mode of the headrest-height controller and to retain the headrest in the RAISED position.

Child restraint 10 includes a headrest-height controller 12 in accordance with a first embodiment of the present disclosure as suggested in FIGS. 1A-C. Child restraint 10 also includes a seat bottom 14 and a seat back 16 arranged to extend upwardly from seat bottom 14 as suggested diagrammatically in FIGS. 1A and 1B.

Seat back 16 of child restraint 10 includes an adjustable headrest 17 and a headrest-supporting backrest 18. Adjustable headrest 17 is mounted for up-and-down movement on backrest 18 at the option of a caregiver using headrest-height controller 12 as suggested in FIGS. 1A-1C. Headrest-height controller 12 is associated with adjustable headrest 17 and linked to adjustable headrest 17 to move therewith relative to backrest 18 as suggested diagrammatically in FIGS. 1A and 1B.

Headrest-height controller 12 includes a headrest lock 20, a headrest-lock mover 24, and a mover activator 23 including an operator handgrip 23G as suggested in FIG. 1. Mover activator 23 is used by a caregiver as disclosed herein to activate headrest-lock mover 24 to operate headrest lock 20 to engage or disengage backrest 18. Headrest-lock mover 24 comprises a two-gear rack-and-pinon system that links mover activator 23 to headrest lock 20 as suggested in FIG. 1C.

Headrest lock 20 comprises laterally movable first and second headrest-motion blockers 21, 22 as suggested in FIGS. 1C and 2A. These headrest-motion blockers 21, 22 are mounted to be moved relative to backrest 18 to engage blocker-receiver sockets (e.g. 181A, 182A) as suggested in FIG. 2A to establish the HEADREST-LOCKING mode of headrest-height controller 12. These headrest-motion blockers can be moved relative to backrest 18 using a two-gear rack-and-pinion system established by first and second blocker movers 51, 52 of headrest-lock mover 24 to disengage blocker-receiver sockets (e.g. 181A, 182A) as suggested in FIG. 2B to establish the HEADREST-UNLOCKING mode of headrest-height controller 12 so that headrest 17 is free to be moved upwardly and downwardly on backrest 18 by a caregiver as suggested in FIG. 1C.

Headrest-height controller 12 is spring-loaded by return spring 23S to move first and second headrest-motion blockers 21, 22 away from one another to engage backrest 18 to block movement of headrest 17 relative to backrest 18 whenever headrest-motion blockers 21, 22 are aligned to confront one of the sets of opposing blocker-receiver sockets (e.g. 181A, 182A and 181B, 182B) formed in backrest 18 as suggested diagrammatically in FIG. 2A. Headrest-height controller 12 is used by a caregiver to move first and second headrest-motion blockers 21, 22 toward one another to free headrest 17 to be moved up or down by the caregiver relative to backrest 18 as suggested diagrammatically in FIGS. 1C and 2B.

Headrest-height controller 12 can function automatically to lock adjustable headrest 17 in one of several predetermined headrest elevation positions on backrest 18 as soon as a caregiver moves an unlocked headrest 17 to one of the those positions as suggested in FIG. 1AC. A caregiver can move the unlocked headrest 17 upwardly or downwardly on backrest 18 as suggested in FIG. 1C to align headrest-motion blockers 21, 22 with one of the sets of opposing blocker-receiver sockets formed in backrest 18 to allow the return spring 23S of headrest-height controller 12 to generate a downward spring force $F_s$ to as suggested in FIG. 2A to move first headrest-motion blocker 21 outwardly in a first direction to extend into the first blocker-receiver socket 181A formed in backrest 18 and move simultaneously second headrest-motion blocker 22 outwardly in an opposite second direction to extend into the opposing second blocker-receiver socket 182A formed in backrest 18 so that up-and-down motion of headrest 17 relative to backrest 18 is blocked. This automatic outward movement of headrest-motion blockers 21, 22 establishes a HEADREST-LOCKING mode of headrest-height controller 12 as suggested in FIG. 2A.

Backrest 18 is formed to include a first set of opposing first and second blocker-receiver sockets 181A, 182A that are located at a first elevation (A) above seat bottom 14 as suggested in FIG. 1C. A first headrest-motion blocker 21 included in headrest lock 20 can be moved by headrest-lock mover 24 using a spring force $F_s$ into the first blocker-receiver socket 181A formed in backrest 18 to lock headrest 17 to backrest 18 as suggested in FIG. 2A. A second headrest-motion blocker 22 included in headrest lock 20 can also be moved simultaneously by headrest-lock mover 24 using spring force $F_s$ into the second blocker-receiver socket 182A formed in backrest 18 as also suggested in FIG. 2B. Headrest-lock mover 24 can also be used to overcome spring force $F_s$ to withdraw simultaneously blocker 21 from socket 181A and blocker 22 from socket 182A to unlock headrest 17 as suggested in FIG. 2B so that headrest 17 is free to be moved by a caregiver relative to backrest 18 to assume a new headrest elevation position.

It is within the scope of this disclosure to form a second set of opposing first and second blocker-receiver sockets 181B, 182B located at a relatively higher second elevation (B) above seat bottom 14 as suggested diagrammatically in FIG. 1C. Other sets of opposing blocker-receiver sockets (not shown) are provided in backrest 18 within the scope of the present disclosure to establish other predetermined headrest elevations for headrest 17 above seat bottom 14.

Figure 2B:
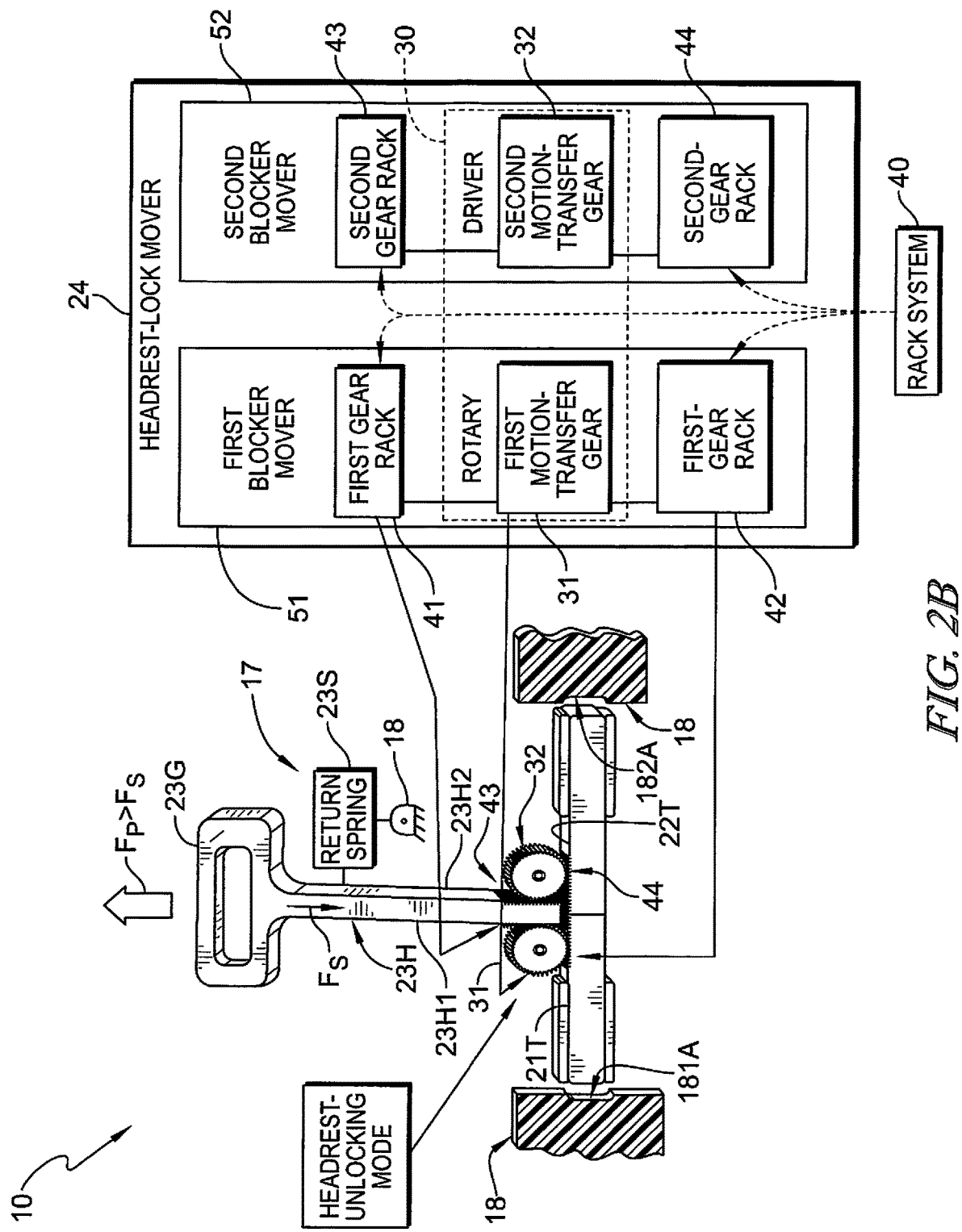
FIG. 2B is a view similar to FIG. 2A suggesting that the return spring is coupled at one end to the activation handle at an opposite end to the backrest and suggesting that the headrest-lock mover of the headrest-height controller includes a first blocker mover for moving the first headrest-motion blocker relative to the backrest and a second blocker mover for moving the second headrest-motion blocker relative to the backrest and suggesting that the rotary driver comprises a first motion-transfer (pinion) gear that is included in the first blocker mover and is mounted for rotation about a first axis of rotation and a second motion-transfer (pinion) gear that is included in the second blocker mover and is mounted for rotation about a separate second and parallel axis of rotation and suggesting that the activation handle has been lifted upwardly away from a seat bottom by a caregiver in opposition to a downward force generated by the return spring to cause.

The caregiver can operate headrest-height controller 12 manually to establish a HEADREST-UNLOCKING mode by causing the first and second headrest-motion blockers 21, 22 to move inwardly toward one another against a spring force $F_s$ generated by return spring 23S to exit the opposing first and second blocker-receiver sockets 181A, 182A formed in backrest 18 as suggested in FIG. 2B. This inward movement of headrest-motion blockers 21, 22 unlocks headrest 17 from backrest 18 to free headrest 17 to be moved up or down on backrest 18 by a caregiver to a new headrest elevation relative to seat bottom 14 that corresponds to a different set of opposing blocker-receiver sockets formed in backrest 18.

Headrest-height controller 12 includes headrest lock 20, headrest-lock mover 24, and mover activator 23 as shown in FIG. 2A. Mover activator 23 is used by a caregiver to activate a two-gear rack-and-pinion system provided by headrest-lock mover 24 to cause the first and second headrest-motion blockers 21, 22 of headrest lock 20 to move into or out of the opposing first and second blocker-receiver sockets 181A, 182A whenever the caregiver desires to change headrest-height controller 12 from the HEADREST-LOCKING mode to the HEADREST-UNLOCKING mode. Headrest-lock mover 24 provides a two-gear rack-and-pinion system in accordance with the present disclosure as suggested in FIGS. 1C, 2A, and 2B.

Headrest-lock mover 24 of headrest-height controller 12 includes a rotary driver 30 as suggested in FIG. 2A. Rotary driver 30 comprises a first motion-transfer (pinion) gear 31 and a second motion-transfer (pinion) gear 32 as suggested in FIG. 2B. Headrest-lock mover 24 also includes a rack system 40 that is shown in FIG. 2B and that meshes with gears 31, 32 of rotary driver 30 to form a two-gear rack-and-pinion system (i.e. headrest-lock mover 24) in accordance with a first embodiment of the present disclosure. Rack system 40 includes one first-gear rack 41 associated with mover activator 23, another first-gear rack 42 associated with first headrest-motion blocker 21, one second-gear rack 43 associated with mover activator 23, and another second-gear rack 44 associated with second headrest-motion blocker 22 as suggested in FIG. 2B.

Mover activator 23 of headrest-height controller 12 includes an activation handle 23H having an operator handgrip 23G and a return spring 23S as shown in FIGS. 2A and 2B. Activation handle 23H can be gripped by a caregiver using operator handgrip 23G and is mounted for up-and-down movement relative to adjustable headrest 17 and to the headrest-supporting backrest 18. Return spring 23S is coupled at one end to activation handle 22H and at an opposite end to the headrest-supporting backrest 18 as suggested diagrammatically in FIGS. 2A and 2B. Return spring 23S is configured to yieldably urge activation handle 23H from a RAISED position associated with the HEAD-REST-UNLOCKING mode of headrest-height controller 12 and shown in FIG. 2B to a LOWERED position associated with the HEADREST-LOCKING mode of headrest-height controller 12 and shown in FIG. 2A whenever headrest 17 is moved to assume one of the several lockable predetermined headrest elevation positions provided on backrest 18.

As suggested in FIG. 2B, another way to understand the functionality of headrest-lock mover 24 of headrest-height controller 12 is to understand that headrest-lock mover 24 of headrest-height controller 12 includes a first blocker mover 51 and a separate second blocker mover 52. First and second blocker movers 51, 52 includes racks and pinion gears and cooperate to provide a two-gear rack-and-pinion system to establish headrest-lock mover 24.

The blocker movers 51, 52 of headrest-lock mover 24 are operable to move the headrest-motion blockers 21, 22 relative to backrest 18 when headrest-height controller 12 has been placed in the HEADREST-UNLOCKING mode by a caregiver as suggested in FIG. 2B. First blocker mover 51 provides first rack-and-pinion means for converting up-and-down movement of activation handle 23H by the caregiver into lateral movement of first headrest-motion blocker 21 relative to the companion first blocker-receiver socket 181A formed in headrest-supporting backrest 18. Second blocker mover 52 provides second rack-and-pinion means for converting up-and-down movement of activation handle 23H by the caregiver into lateral movement of second headrest motion blocker 22 relative to the companion second blocker-receiver socket 182A formed in headrest-supporting backrest 18.

First blocker mover 51 of lock mover 24 comprises first motion-transfer (pinion) gear 31 of rotary driver 30 and first-gear racks 41, 42 of rack system 40 as suggested in FIG. 2B. First-gear rack 41 is coupled to a first side 23H1 of activation handle 23H to move up and down therewith relative to backrest 18 as suggested in FIGS. 2A and 2B. First-gear rack 42 is coupled to a topside 21T of first headrest-motion blocker 21 to move laterally therewith relative to backrest 18. First motion-transfer gear 31 is mounted to rotate about a first gear-rotation axis 31A and to mesh simultaneously with teeth included in first-gear racks 41, 42 as suggested in FIGS. 2A and 2B.

Second blocker mover 52 of headrest-lock mover 24 includes second motion-transfer (pinion) gear 32 of rotary driver 30 and second-gear racks 43, 44 of rack system 40 as suggested in FIG. 2B. Second-gear rack 43 is coupled to a second side 23H2 of activation handle 23H to move up and down therewith relative to backrest 18 as suggested in FIGS. 2A and 2B. Second-gear rack 44 is coupled to a topside 22T of second headrest-motion blocker 22 to move laterally therewith relative to backrest 18. Second motion-transfer gear 32 is mounted to rotate about a second gear-rotation axis 32A and to mesh simultaneously with teeth included in second-gear racks 43, 44 as suggested in FIGS. 2A and 2B. First and second gear-rotation axes 31A, 32A are fixed on backrest 18 to lie in spaced-apart parallel relation to one another as suggested in FIG. 2A.

An illustrative view of a headrest-height controller 12 in accordance with a first embodiment of the present disclosure is provided in FIG. 2A. Headrest-height controller 12 includes a headrest lock 20, a headrest-lock mover 24, and a mover activator 23 including a return spring 23S and an activator handle 23H that can be gripped and moved by a caregiver to actuate headrest-lock mover 24 to unlock headrest lock 20 as suggested in FIG. 2. Headrest lock 20 includes laterally movable first and second headrest-motion blockers 21, 22 that are urged normally in opposite directions by headrest-lock mover 24 and handle-return spring 23S to extend into opposing first and second blocker-receiver sockets 181A, 182A formed in backrest 18 of seat back 16 to retain headrest 17 in a selected elevation above an underlying seat bottom 14. Headrest-lock mover 24 includes a two-gear rack-and-pinion system in accordance with the present disclosure in which a rotary driver 30 comprising first and second motion-transfer gears 31, 32 is used to move the headrest-motion blockers 21, 22 into and out of the blocker-receiver sockets 181A, 182A in response to up-and-down movement of activation handle 23H by a caregiver relative to backrest 18.

Headrest-lock mover 24 of headrest-height controller 12 includes a first blocker mover 51 for moving first headrest-motion blocker 21 relative to backrest 18 and a second blocker mover 52 for moving second headrest-motion blocker 22 relative to backrest 18 as suggested in FIG. 2B. Rotary driver 30 comprises a first motion-transfer gear 31 that is included in first blocker mover 51 and a second motion-transfer gear 32 that is included in second blocker mover 52. Return spring 23S of mover activator 23 is coupled at one end to activation handle 23H at an opposite end to backrest 18 as suggested in FIG. 2B. As suggested in FIG. 2B, activation handle 23H has been lifted upwardly away from seat bottom 14 by a caregiver in opposition to a downward force generated by return spring 23S to cause: (1) first motion-transfer gear 31 of rotary driver 30 to rotate about a first axis of rotation 31A in a counterclockwise direction owing to meshing engagement with a first-gear rack 41 included in the rack-and-pinion system of headrest-lock mover 24 and coupled to a first side 23H1 of activation handle 23H to cause first headrest-motion blocker 21 to slide to the right and exit the first blocker-receiver socket 181A owing to engagement of first motion-transfer gear 31 with another first-gear rack 42 included in the rack-and-pinion system of headrest-lock mover 24 coupled to a topside 21T of first headrest-motion blocker 21 and (2) the second motion-transfer gear 32 of rotary driver 30 to rotate about a separate second axis of rotation 32A in a clockwise direction owing to meshing engagement with one second-gear rack 43 included in the rack-and-pinion system of headrest-lock mover 24 and coupled to an opposite second side 23H2 of activation handle 23H to cause second headrest-motion blocker 22 to slide to left and exit second blocker-receiver socket 182A owing to meshing engagement of the second motion-transfer gear 32 with another second-gear rack 44 included in the rack-and-pinion system of headrest-lock mover 24 and coupled to a topside 22T of second headrest-motion blocker 22 so that a HEADREST-UNLOCKING mode of headrest-height controller 12 is established and the adjustable headrest 17 is free to be raised or lowered on backrest 18 by the caregiver to a new elevation relative to seat bottom 14.

In use, headrest 17 is locked to backrest 18 in the HEADREST-LOCKING mode to remain in one of several predetermined headrest elevation positions in the following manner. When headrest 17 is moved upwardly or downwardly on backrest 18 by the caregiver to reach a desired headrest elevation position on backrest 18, the two companion headrest-motion blockers 21, 22 of headrest lock 20 are positioned to lie between the two opposing blocker-receiver sockets (e.g. 181A, 182A) that correspond to the desired headrest elevation position. At that point, first and second headrest-motion blockers 21, 22 are moved away from one another by spring forces generated by a return spring 23S included in headrest-height controller 12 to cause first headrest-motion blocker 21 to extend laterally outwardly in one direction into a first blocker-receiver socket (e.g. 181A) and a second headrest-motion blocker 22 to extend laterally outwardly in a second direction into a companion opposing second blocker-receiver socket (e.g. 182A) to lock the adjustable headrest 17 to backrest 18 at a selected headrest elevation position above seat bottom 14 and place headrest-height controller 12 in the HEADREST-LOCKING mode.

In use, headrest 17 is unlocked in the following manner. To free the adjustable headrest for up-and-down movement on backrest 18 and place headrest-height controller 12 in the HEADREST-UNLOCKING mode, the caregiver uses activation handle 23H of mover activator 23 of headrest-height controller 12 to actuate the rack-and-pinion system included in lock mover 26 to cause first and second headrest-motion blockers 21, 22 to move toward one another against spring forces generated by return spring 23S and exit the opposing blocker-receiver sockets formed in backrest 18 so that the adjustable headrest 17 is no longer locked to backrest 18 and is free to be moved upwardly or downwardly on backrest 18 by the caregiver to a new headrest elevation position relative to seat bottom 14.

Return spring 23S is included in mover activator 23 of headrest-height controller 12 along with activation handle 23H. Return spring 23S is arranged to cause the two movable headrest-motion blockers 21; 22 normally to move outwardly away from one another into one of the several sets of companion blocker-receiver sockets (e.g. 181A, 182A) that are formed in backrest 18 when headrest is moved by the caregiver to reach a desired headrest elevation position and the blockers and sockets are aligned so that up-and-down movement of headrest 17 relative to backrest 18 is blocked.

An operator handgrip 23G is included activation handle 23H of mover activator 23 of headrest-height controller 12 and is located in an EXPOSED position adjacent to an upper portion of the adjustable headrest 17. A caregiver applies a lifting force to operator handgrip 23G of activation handle 23H to activate headrest-lock mover 24 and thereby cause the pair of headrest-motion blockers 21, 22 to move laterally toward one another against the spring forces generated by return spring 23S to exit the blocker-receiver sockets (e.g. 181A, 182A) formed in backrest 18 so as to free the adjustable headrest 17 for up-and-down movement on backrest 18 relative to seat bottom 14. One end of return spring 23S is coupled to activation handle 23H of mover activator 23 and another end of return spring 23S is coupled to backrest 18. Return spring 23S is arranged normally to urge activation handle 23H downwardly to a LOWERED position relative to backrest 18 to cause the headrest-motion blockers 21, 22 to move away from one another.

Child restraint 10 comprises a seat bottom 14, a seat back 16, and a headrest-height controller 12 as suggested in FIGS. 1A-1C. Seat back 16 includes a backrest 18 arranged to extend upwardly from seat bottom 14 and an adjustable headrest 17 mounted for up-and-down movement on backrest 18 between a LOWERED position located at a first distance from seat bottom 14 and a RAISED position located at a relatively higher second distance from seat bottom 14 to accommodate and seat children of different sizes.

Headrest-height controller 12 is mounted on the adjustable headrest 17 for up-and-down with the adjustable headrest 17 relative to backrest 18 as suggested in FIGS. 1A and 1B. Headrest-height controller 12 includes a headrest lock 20, a mover activator 23, and a headrest-lock mover 24. Headrest lock 20 is arranged to move relative to seat bottom 14 to engage and disengage backrest to control up-and-down movement of the adjustable headrest 17 between the LOWERED and RAISED positions. Mover activator 23 includes an activation handle 23H mounted on the adjustable headrest 17 for up-and-down movement relative to the adjustable headrest 17 and backrest 18. Headrest-lock mover 24 is arranged to move headrest lock 20 relative to backrest 18 to disengage backrest 18 to free the adjustable headrest 17 to move up and down relative to backrest 18 in response to upward movement of activation handle 23H relative to backrest 18 and away from seat bottom 14 and to engage backrest 18 to retain headrest 17 in a selected one of the LOWERED and RAISED positions in response to downward movement of the adjustable headrest 17 relative to backrest 18 and toward seat bottom 14 upon arrival of the adjustable headrest 17 at such a selected one of the LOWERED and RAISED positions and during downward movement of activation handle 17 relative to backrest 18.

Backrest 18 is formed as suggested in FIG. 1C to include a lower set of opposing first and second blocker-receiver socket 181A, 182A located at a first height above seat bottom 14 to align with the LOWERED position of the adjustable headrest 17 and an upper set of first and second opposing blocker-receiver sockets 181B, 182B located at a relatively higher second height above seat bottom 14 to align with the RAISED position of the adjustable headrest 17. Headrest lock 20 includes a first headrest-motion blocker 21 that is constrained to move laterally relative to the adjustable headrest 17 (1) to extend into the first blocker-receiver socket 181A of the lower set to engage backrest 14 in response to application of an outward movement-inducing force applied to first headrest-motion blocker 21 by headrest-lock mover 24 when the adjustable headrest 17 is located in the LOWER position and activation handle 23H is moved downwardly relative to backrest 18 and toward seat bottom to establish a HEADREST-LOCKING MODE of headrest-height controller 12 and (2) to withdraw from the first blocker-receiver socket 181A of the lower set to disengage backrest 18 in response to application of an inward movement-inducing force applied to first headrest-motion blocker 21 by headrest-lock mover 24 when the adjustable headrest 17 is located in the LOWER position and activation handle 23H is moved upwardly relative to backrest 18 and away from seat bottom 14 to establish a HEADREST-UNLOCKING MODE of the headrest-height controller 12.

Headrest-lock mover 24 includes one driver-engagement rack 41 coupled to activation handle 23H, another driver-engagement rack 42 coupled to first headrest-motion blocker 21, and a rotary driver 230 mounted for rotation relative to backrest 18 to convert motion of activation handle 23H relative to backrest 18 into motion of first headrest-motion blocker 21 relative to backrest 18 owing to meshing engagement of teeth in rotary driver 30 with teeth in the driver-engagement racks 41, 42 to cause the outward and inward movement-inducing forces to be applied to first headrest-motion blocker 21 in response to movement of activation handle 23H relative to backrest 18.

Mover activator 23 of headrest-height controller 12 further includes a return spring 23S that is coupled to each of the activation handle 23H and the backrest 18 and biased normally and yieldably to urge activation handle 23H to move downwardly relative to backrest 18 and toward seat bottom 14 to rotate rotary driver 30 included in the headrest-lock mover 24 owing to meshing engagement of teeth in the driver-engagement rack 41 coupled to activation handle 23H and teeth in rotary driver 30 so that rotation of rotary driver 30 moves first headrest-motion blocker 21 relative to backrest 18 to extend into the first blocker-receiver socket 181A of the lower set owing to meshing engagement of the teeth in rotary driver 30 and teeth in the driver-engagement rack 42 coupled to the first headrest-motion blocker 21 as rotary driver 30 rotates relative to backrest 18.

Headrest lock 20 further includes a second headrest-motion blocker 22 that is constrained to move laterally relative to the adjustable headrest 17 laterally away from the first headrest-motion blocker 21 (1) to extend into the second blocker-receiver socket 182A of the lower set to engage backrest 18 in response to application of an outward movement-inducing force applied to second headrest-motion blocker 22 by headrest-lock mover 24 when the adjustable headrest 17 is located in the lower position and activation handle 23H is moved downwardly relative to the backrest 18 and toward seat bottom 14 to establish a HEADREST-LOCKING MODE of the headrest-height controller 12 and (2) to withdraw from the second blocker-receiver socket 182A of the lower set to disengage backrest 18 in response to application of an inward movement-inducing force applied to second headrest-motion blocker 22 by headrest-lock mover 24 when the adjustable headrest 17 is located in the LOWER position and activation handle 23H is moved upwardly relative to backrest 18 and away from seat bottom 14 to establish a HEADREST-UNLOCKING MODE of headrest-height controller 12.

Headrest-lock mover 24 further includes one auxiliary driver-engagement rack 43 that is coupled to activation handle 23H and another auxiliary driver-engagement rack 44 that is coupled to second headrest-motion blocker 22 as suggested in FIG. 2B. Rotary driver 30 is mounted for rotation relative to backrest 18 to convert motion of activation handle 23H relative to backrest 18 into motion of second headrest-motion blocker 22 relative to backrest owing to meshing engagement of teeth in rotary driver 30 with teeth in the auxiliary engagement racks 43, 44 to cause outward and inward movement-inducing forces to be applied to second headrest-motion blocker 22 in response to movement of activation handle 23H relative to backrest 18.

Rotary driver comprises a first motion-transfer gear 31 that is mounted on backrest 18 for rotation about a first axis of rotation 31A and a second motion-transfer gear 32 that is mounted for rotation about a second axis of rotation 32A that lies in spaced-apart parallel relation to first axis of rotation 31A as suggested in FIG. 2A. First motion-transfer gear 31 includes teeth that mesh with teeth included in the driver-engagement racks 42, 43 that are coupled, respectively, to activation handle 23H and to first headrest-motion blocker 21 during rotation of first motion-transfer gear 31 about first axis of rotation 31A. Second motion-transfer gear 32 includes teeth that mesh with teeth included in the auxiliary driver-engagement racks 41, 44 that are coupled, respectively, to activation handle 23H and to second headrest-motion blocker 22 during rotation of second motion-transfer gear 32 about second axis of rotation 32A.

First motion-transfer gear 31A is mounted on a first axle coupled to backrest 18 to rotate in a clockwise direction. Second motion-transfer gear 32 is mounted on a separate second axle coupled to backrest 18 to rotate in a counterclockwise direction when first motion-transfer gear 31 rotates in the clockwise direction as is apparent from FIGS. 2A and 2B.

Activation handle 23H includes a first side facing 23H1 toward the first blocker-receiver socket 181A of the lower set and an opposite second side 23H2 facing toward the second blocker-receiver socket 182A of the lower set as suggested in FIG. 2B. The one driver-engagement rack 41 of headrest-lock mover 24 is coupled to first side 23H1 of activation handle 23H to engage teeth in first motion-transfer gear 31. The one auxiliary driver-engagement rack 43 of headrest-lock mover 24 is coupled to the opposite second side 23H2 of activation handle 23H to engage teeth in second motion-transfer gear 32. First headrest-motion blocker 21 includes a topside 21T arranged to face upwardly away from seat bottom 14. The another driver-engagement rack 42 of headrest-lock mover 24 is coupled to the topside 21T of the first headrest-motion blocker 21 to engage teeth in first motion-transfer gear 31. Second headrest-motion blocker 22 includes a topside 22T arranged to face upwardly away from seat bottom 14. The another auxiliary driver-engagement rack 44 of headrest-lock mover 24 is coupled to the topside 22T of second headrest-motion blocker 22 to engage teeth in second motion-transfer gear 32.

A child restraint 210 including a headrest-height controller 212 in accordance with a second embodiment of the disclosure is shown in FIGS. 3-17.

Child restraint 210 also includes a seat bottom 214 and a seat back 216 extending upwardly from seat bottom 214 as shown in FIGS. 3A-3C. Seat back 216 includes an adjustable headrest 217 and a headrest-supporting backrest 218. Adjustable headrest 217 is mounted for up-and-down movement on backrest 218 at the option of a caregiver using headrest-height controller 212.

Backrest 218 is formed to include at least several vertically spaced-apart sets of opposing first and second blocker-receiver sockets as suggested in FIGS. 3C and 4B. Each set is located at a different elevation above seat bottom 214 to establish one of the predetermined headrest elevation positions of headrest 217 that can be selected by a caregiver using headrest-height controller 212 as suggested in FIG. 3C.

Backrest 218 is formed to include at least one set of opposing first and second blocker-receiver sockets 181A, 182A that are located at a first elevation above seat bottom 14 as suggested diagrammatically in FIG. 9. It is within the scope of this disclosure to form backrest 218 to include a second set of opposing first and second blocker-receiver sockets 181B, 182B located at a relatively higher second elevation above seat bottom 214 as suggested diagrammatically in FIG. 3C. Other sets of opposing blocker-receiver sockets are within the scope of the present disclosure to establish other elevations for headrest 217 above seat bottom 214 as suggested in FIG. 4B.

Headrest-height controller 212 includes a headrest lock 220, a headrest-lock mover 224, and a mover activator 223 as suggested in FIG. 7. Headrest-lock mover 224 comprises a two-gear rack-and-pinion system that links mover activator 223 to headrest lock 220 as suggested in FIG. 7.

Headrest lock 220 comprises laterally movable first and second headrest-motion blockers 221, 222 as suggested in FIGS. 5-7 and 9. Headrest-height controller 212 is used by a caregiver either to move first and second headrest-motion blockers 221, 222 away from one another to engage backrest 218 to block movement of headrest 17 relative to backrest 218 or to move first and second headrest-motion blockers 221, 222 toward one another to free headrest 217 to be moved up or down by caregiver relative to backrest 218.

A caregiver can operate headrest-height controller 212 to move first headrest-motion blocker 221 outwardly in a first direction to extend into the first blocker-receiver socket 181A formed in backrest 218 and move second headrest-motion blocker 222 outwardly in an opposite second direction to extend into the opposing second blocker-receiver socket 182A formed in backrest 218 so that up-and-down motion of headrest 217 relative to backrest 18 is blocked as suggested in FIG. 9. This outward movement of headrest-motion blockers 221, 222 establishes a HEADREST-LOCKING mode of headrest-height controller 212 as suggested in FIGS. 8, 8A, 8B and 9.

Alternatively, the caregiver can operate headrest-height controller 212 to establish a HEADREST-UNLOCKING mode as suggested in FIGS. 12, 12A, and 13 by causing the first and second headrest-motion blockers 221, 222 to move inwardly toward one another to exit the opposing first and second blocker receiver sockets 181A, 182A formed in backrest 218. This inward movement of headrest-motion blockers 221, 222 unlocks headrest 217 from backrest 218 to and free headrest 217 to move up or down on backrest 218 as desired by a caregiver to a new headrest elevation position relative to seat bottom 214.

Mover activator 223 is used by a caregiver to activate a two-gear rack-and-pinion system provided by lock mover 224 to cause the first and second headrest-motion blockers 221, 222 of headrest lock 212 to move into or out of the opposing first and second blocker-receiver sockets 181A, 182A when the caregiver desires to change headrest-height controller 212 the HEADREST-LOCKING mode to the HEADREST-UNLOCKING mode. Headrest-lock mover 224 provides a two-gear rack-and-pinion system in accordance with the present disclosure as suggested in FIGS. 7 and 7A.

Headrest-lock mover 224 includes a rotary driver 230 comprising a first motion-transfer gear 231 and a second motion-transfer gear 232 as suggested in FIGS. 7 and 7A. Headrest-lock mover 224 also includes a rack system 240 that meshes with rotary driver 230 to form a two-gear rack-and-pinion system in accordance with a second embodiment of the present disclosure. Rack system 240 includes one first-gear rack 241 associated with first headrest-motion blocker 221, another first-gear rack 242 associated with second headrest-motion blocker 222, one second-gear rack 243 associated with mover activator 223, and another second-gear rack 244 associated with mover activator 223 as suggested in FIG. 7.

Mover activator 223 includes an activation handle 223H and a return spring 223S as suggested in FIG. 6. Activation handle 223H can be gripped by a caregiver and is mounted for up-and-down movement relative to adjustable headrest 217 and to the headrest-supporting backrest 218. Return spring 223S is coupled to activation handle 223H and to the headrest-supporting backrest 218 as suggested diagrammatically in FIG. 6 and is configured to normally and yieldably urge activation handle 223H from a RAISED position associated with the HEADREST-UNLOCKING mode of headrest-height controller 212 and shown in FIG. 9 to a LOWERED position associated with the HEADREST-LOCKING mode of headrest-height controller 212 and shown in FIG. 13.

Headrest-lock mover 224 includes a rotary driver 230 comprising a first motion-transfer gear 231 and a second motion-transfer gear 232 as suggested in FIGS. 7 and 7A. Headrest-lock mover 224 also includes a rack system 240 that meshes with rotary driver 230 to form a two-gear rack-and-pinion system in accordance with a second embodiment of the present disclosure. Rack system 240 includes one first-gear rack 242 associated with first headrest-motion blocker 221, another first-gear rack 244 associated with second headrest-motion blocker 222, and at least one second-gear rack 241 associated with mover activator 223 as suggested in FIG. 7. Another second-gear rack 243 may be associated with mover activator 223.

As suggested in FIG. 6, an upper end of return spring 223S is coupled to a first spring mount 223M included in a lower end of activation handle 223H. A lower end of the return spring 223S is coupled to a second spring mount 218M included in a portion of backrest 218 as suggested in FIG. 6.

Adjustable headrest 217 includes a center panel 2170 flanked by oppositely extending first and second side wings 2171, 2172 as shown in FIG. 6. Headrest-height controller 212 is adapted to be mounted on center panel 2170 of adjustable headrest 217 for up-and-down movement therewith relative to backrest 218 as suggested in FIGS. 3A, 3B, and 5.

Headrest-height controller 212 includes a headrest lock 220, a headrest-lock mover 224, and a mover activator 223 as suggested in FIG. 7. Headrest lock 220 includes slidable first and second headrest-motion blockers 221, 222. Headrest-lock mover 224 provides a two-gear rack-and-pinion system that includes a first-gear rack 242 on first headrest-motion blocker 221, another first-gear rack 244 on second headrest-motion blockers 222, two second-gear racks 241, 243 on activation handle 223H included in lock-mover activator 223, and a rotary driver 230 having a first motion-transfer gear 221 engaging the two first-gear racks 241, 243 associated with the first and second headrest-motion blockers 221, 222 and a second motion-transfer gear 222 engaging the two second-gear racks 242, 244 associated with the activation handle 223H. Activation handle 223H of mover activator 223 can be gripped at an upper end 223U thereof by a caregiver and moved relative to backrest 218 and headrest 217 to activate the two-gear rack-and-pinion system provided by headrest-lock mover 224.

An enlarged perspective view of rotary driver 230 is provided in FIG. 7A to show that rotary driver 230 includes a first motion-transfer gear 231 on the left, a second motion-transfer gear 232 on the right, and a cylinder-shaped gear mount 233 arranged to lie between and interconnect the two motion-transfer gears 231, 232 so that they will rotate in the same direction about a common axis of rotation 230A.

Headrest-height controller 212 includes a headrest lock 220, a headrest-lock mover 224, and a mover activator 223 as suggested in FIG. 7. Headrest lock 220 includes slidable first and second headrest-motion blockers 221, 222. Headrest-lock mover 224 provides a two-gear rack-and-pinion system that includes a first-gear rack 242 on first headrest-motion blocker 221, another first-gear rack 244 on second headrest-motion blockers 222, a second-gear rack 241 on activation handle 223H included in lock-mover activator 223, and a rotary driver 230 having a first motion-transfer gear 221 engaging the two first-gear racks 242, 244 associated with the first and second headrest-motion blockers 221, 222 and a second motion-transfer gear 222 engaging the second-gear rack 241 associated with the activation handle 223H. Activation handle 223H of mover activator 223 can be gripped at an upper end 223U thereof by a caregiver and moved relative to backrest 218 and headrest 217 to activate the two-gear rack-and-pinion system provided by headrest-lock mover 224.

First and second headrest-motion blockers 221, 222 are shown in their motion-blocking extended positions in FIG. 10. A forward-facing second motion-transfer gear 232 of rotary driver 230 into a driver-receiving slot 230A formed in a lower end of activation handle 223H. The forward-facing second motion-transfer gear 232 is meshingly engaged with the two opposing second-gear racks 241, 243 that are coupled to a lower end of activation handle 223H. These two opposing first-gear racks 241, 243 are arranged to lie in spaced-apart relation to one another to engage the forward-facing second motion-transfer gear 232 that is positioned to lie therebetween so as to help establish a two-gear rack-and-pinion driving connection between activation handle 223H and first and second headrest-motion blockers 221, 222 as suggested in FIG. 10.

A rearward-facing first motion-transfer gear 231 of rotary driver 230 is extended into a driver-receiving channel 230C defined between a horizontally extending first rack-support strip 221S included in first headrest-motion blocker 221 and a horizontally extending second rack-support strip 222S included in second headrest-motion blocker 222 as shown in FIG. 11. First motion-transfer gear 231 of the rotary driver 230 is engaged with (1) one first-gear rack 242 coupled to the first rack-support strip 221S of first headrest-motion blocker 221 and (2) another first-gear rack 244 coupled to the second rack-support strip 222S of second headrest-motion blocker 222 and arranged to lie in opposing laterally spaced-apart relation to the first-gear rack 242 also to help establish the two-gear rack-and-pinion driving connection between activation handle 223H and first and second headrest-motion blockers 221, 222.

Headrest-height controller 212 is shown in a HEADREST-UNLOCKING mode in FIGS. 12 and 12A to free headrest 217 for up-and-down movement relative to the adjacent headrest-supporting backrest 218 after the caregiver has gripped an operator grip 223G included in activation handle 223H and raised activation handle 223H in an upward direction against a spring force generated by return spring 223S. As suggested in FIGS. 12A and 13, rotary driver 230 included in headrest-lock mover 224 of headrest-height controller 212 has been rotated about its axis of rotation 230A by the raised activation handle 223H of mover activator 223 to move first and second headrest-motion blockers 221, 222 laterally inwardly toward one another to exit the companion opposing blocker-receiver sockets 181A, 182A (shown diagrammatically in FIG. 13) formed in the adjacent headrest-supporting backrest 217.

First and second headrest-motion blockers 221, 222 are shown in their motion-blocking extended positions in FIG. 10. A forward-facing second motion-transfer gear 232 of rotary driver 230 into a driver-receiving slot 230A formed in a lower end of activation handle 223H. The forward-facing second motion-transfer gear 232 is meshingly engaged with the second-gear rack 241 that is coupled to a lower end of activation handle 223H. The second gear-rack 241 is arranged to engage the forward-facing second motion-transfer gear 232 so as to help establish a two-gear rack-and-pinion driving connection between activation handle 223H and first and second headrest-motion blockers 221, 222 as suggested in FIG. 10.

In use, headrest 217 is locked to backrest 218 in the HEADREST-LOCKING mode to remain in one of several predetermined headrest elevation positions in the following manner. When headrest 217 is moved upwardly or downwardly on backrest 218 by the caregiver to reach a desired headrest elevation position on backrest 218, the two companion headrest-motion blockers 221, 222 of headrest lock 220 are positioned to lie between the two opposing blocker-receiver sockets that correspond to the desired headrest elevation position. At that point, first and second headrest-motion blockers 221, 222 are moved away from one another by spring forces generated by a return spring 223S included in headrest-height controller 212 to cause first headrest-motion blocker 221 to extend laterally outwardly in one direction into a first blocker-receiver socket and a second headrest-motion blocker 222 to extend laterally outwardly in an opposite second direction into a companion opposing second blocker-receiver socket to lock the adjustable headrest 217 to the backrest 218 at a selected headrest elevation position above seat bottom 214 and place headrest-height controller 212 in the HEADREST-LOCKING mode.

In use, headrest 217 is unlocked in the following manner. To free the adjustable headrest 217 for up-and-down movement on backrest 218 and place headrest-height controller 212 in the HEADREST-UNLOCKING mode, the caregiver uses activation handle 223H of mover activator 223 of headrest-height controller 212 to actuate the rack-and-pinion system included in headrest-lock mover 224 to cause first and second headrest-motion blockers 221, 222 to move toward one another against spring forces generated by return spring 223S and exit the opposing blocker-receiver sockets formed in backrest 218 so that the adjustable headrest 217 is no longer locked to backrest 218 and is free to be moved upwardly or downwardly on backrest 218 by the caregiver to a new headrest elevation position relative to seat bottom 214.

In illustrative embodiments, a return spring 223S is included in the mover activator 223 of headrest-height controller 212 along with activation handle 223H. Return spring 223S is arranged to cause the two movable headrest-motion blockers 221, 222 normally to move outwardly away from one another into one of the several sets of companion blocker-receiver sockets that are formed in backrest 218 when headrest 217 is moved by the caregiver to reach a desired headrest elevation position and the blockers and sockets are aligned so that up-and-down movement of headrest 217 relative to backrest 218 is blocked.

In illustrative embodiments, an operator handgrip 223G is included activation handle 223H of mover activator 223 of headrest-height controller 212 and is located in an EXPOSED position adjacent to an upper portion of the adjustable headrest 217 as shown in FIGS. 4A and 8. A caregiver applies a lifting force to operator handgrip 223G of activation handle 223H to activate headrest-lock mover 224 and thereby cause the pair of headrest-motion blockers 221, 222 to move laterally toward one another against the spring forces generated by return spring 223S to exit the blocker-receiver sockets formed in backrest 218 so as to free the adjustable headrest 217 for up-and-down movement on backrest 218 relative to seat bottom 214. One end of return spring 223S is coupled to activation handle 223H of mover activator 223 and another end of return spring 223S is coupled to backrest 18. Return spring 223S is arranged normally to urge the activation handle 223H downwardly to a LOWERED position relative to backrest 218 to cause the headrest-motion blockers 221, 222 to move away from one another.

Child restraint 210 comprises a seat bottom 214, a seat back 216, and a headrest-height controller 212 as suggested in FIGS. 3A-3C. Seat back 216 includes a backrest 218 arranged to extend upwardly from seat bottom 214 and an adjustable headrest 217 mounted for up-and-down movement on backrest 218 between a LOWERED position located at a first distance from seat bottom 214 and a RAISED position located at a relatively higher second distance from seat bottom 214 to accommodate and seat children of different sizes.

Headrest-height controller 212 is mounted on the adjustable headrest 217 for up-and-down with the adjustable headrest 217 relative to backrest 218. Headrest-height controller 212 includes a headrest lock 220, a mover activator 223, and a headrest-lock mover 224 as suggested in FIGS. 3A-3C. Headrest lock 220 is arranged to move relative to seat bottom 214 to engage and disengage backrest 218 to control up-and-down movement of the adjustable headrest 217 between the LOWERED and RAISED positions. Mover activator 233 includes an activation handle 223H mounted on the adjustable headrest 217 for up-and-down movement relative to the adjustable headrest 217 and backrest 218. Headrest-lock mover 224 is arranged to move headrest lock 220 relative to backrest 218 to disengage backrest 218 to free the adjustable headrest 217 to move up and down relative to backrest 218 in response to upward movement of activation handle 223H relative to backrest 218 and away from seat bottom 214 and to engage backrest 218 to retain headrest 217 in a selected one of the LOWERED and RAISED positions in response to downward movement of the adjustable headrest 217 relative to backrest 218 and toward seat bottom 214 upon arrival of the adjustable headrest 217 at such a selected one of the LOWERED and RAISED positions and during downward movement of activation handle 217 relative to backrest 218.

Backrest 218 is formed to include a lower set of opposing first and second blocker-receiver sockets 181A, 182A located at a first height above seat bottom 214 to align with the LOWERED position of the adjustable headrest 217 and an upper set of first and second opposing blocker-receiver sockets 181A, 182A located at a relatively higher second height above seat bottom 214 to align with the RAISED position of the adjustable headrest 217 as suggested in FIG. 3C. Headrest lock 220 includes a first headrest-motion blocker 221 that is constrained to move laterally relative to the adjustable headrest 217 (1) to extend into the first blocker-receiver socket 181A of the lower set to engage backrest 218 in response to application of an outward movement-inducing force applied to first headrest-motion blocker 221 by headrest-lock mover 224 when the adjustable headrest 217 is located in the LOWER position and activation handle 223H is moved downwardly relative to backrest 218 and toward seat bottom 214 to establish a HEADREST-LOCKING MODE of headrest-height controller 212 and (2) to withdraw from the first blocker-receiver socket 181A of the lower set to disengage backrest 218 in response to application of an inward movement-inducing force applied to first headrest-motion blocker 221 by headrest-lock mover 224 when the adjustable headrest 217 is located in the LOWER position and activation handle 223H is moved upwardly relative to backrest 218 and away from seat bottom 214 to establish a HEADREST-UNLOCKING MODE of headrest-height controller 212.

Headrest-lock mover 224 includes one driver-engagement rack 241 coupled to activation handle 223H, and another driver-engagement rack 242 coupled to first headrest-motion blocker 221 as shown in FIG. 7. Headrest-lock mover 224 also includes a rotary driver 230 mounted for rotation relative to backrest 218 to convert motion of activation handle 223H relative to backrest 218 into motion of first headrest-motion blocker 221 relative to backrest 218 owing to meshing engagement of teeth in rotary driver 230 with teeth in the driver-engagement racks 241, 242 to cause the outward and inward movement-inducing forces to be applied to first headrest-motion blocker 221 in response to movement of activation handle 223H relative to backrest 218.

Mover activator 223 of headrest-height controller 212 further includes a return spring 223S as suggested in FIG. 6. Return spring 223S is coupled to each of activation handle 223H and backrest 218 and biased normally and yieldably to urge activation handle 223H to move downwardly relative to backrest 218 and toward seat bottom 214 to rotate rotary driver 230 included in headrest-lock mover 224 owing to meshing engagement of teeth in the driver-engagement rack 241 coupled to activation handle 223H and teeth in rotary driver 230 so that rotation of rotary driver 230 moves first headrest-motion blocker 221 relative to backrest 218 to extend into first blocker-receiver socket 181A of the lower set owing to meshing engagement of the teeth in rotary driver 230 and of teeth in the driver-engagement rack 242 coupled to first headrest-motion blocker 221 as rotary driver 230 rotates relative to backrest 218.

Headrest lock 220 further includes a second headrest-motion blocker 222 as suggested in FIG. 7. Second headrest-motion blocker 222 is constrained to move laterally relative to the adjustable headrest 217 laterally away from the first headrest-motion blocker 221 to (1) extend into the second blocker-receiver socket 182 of the lower set to engage backrest 218 in response to application of an outward movement-inducing force applied to second headrest-motion blocker 222 by headrest-lock mover 224 when the adjustable headrest 217 is located in the LOWER position and activation handle 223H is moved downwardly relative to backrest 218 and toward seat bottom 214 to establish a HEADREST-LOCKING MODE of headrest-height controller 212 and (2) to withdraw from the second blocker-receiver socket 182A of the lower set to disengage backrest 218 in response to application of an inward movement-inducing force applied to second headrest-motion blocker 222 by headrest-lock mover 224 when the adjustable headrest 217 is located in the lower position and activation handle 223H is moved upwardly relative to backrest 218 and away from seat bottom 214 to establish a HEADREST-UNLOCKING MODE of headrest-height controller 212.

Headrest-lock mover 224 further includes another auxiliary driver-engagement rack 244 coupled to second headrest-motion blocker 222 as suggested in FIG. 7. Rotary driver 230 is mounted for rotation relative to backrest 218 to convert motion of activation handle 223H relative to backrest 218 into motion of second headrest-motion blocker 222 relative to backrest 218 owing to meshing engagement of teeth in rotary driver 230 with teeth in the engagement racks 241, 244 to cause outward and inward movement-inducing forces to be applied to second headrest-motion blocker 222 in response to movement of activation handle 223H relative to backrest 218.

Rotary driver 230 comprises a first motion-transfer gear 231, a second motion-transfer gear 232, and a gear mount 233 as suggested in FIG. 7A. Gear mount 233 is arranged to lie between and interconnect the first and second motion-transfer gears 231, 232 so that first and second motion-transfer gears 231, 232 rotate in the same direction about a common axis of rotation 230A relative to backrest 218. First motion-transfer gear 231 includes teeth that mesh with the teeth included in the driver-engagement racks 241, 242 that are coupled to activation handle 223H and to first headrest-motion blocker 221 during rotation of first motion-transfer gear 231 about the common axis of rotation 230A. Second motion-transfer gear 232 includes teeth that mesh with teeth included in the driver-engagement racks 241, 244 that are coupled to activation handle 223H and to second headrest-motion blocker 222 during rotation of the second motion-transfer gear 232 about the common axis of rotation 230A.

Activation handle 223H includes a first inner edge facing toward the second blocker-receiver socket 182A of the lower set and an opposite second inner edge facing toward the first inner edge and the first blocker-receiver socket 181A of the lower set. The one driver-engagement rack 243 of headrest-lock mover 224 is coupled to the first inner edge of activation handle 223H to engage teeth in second motion-transfer gear 232. The one auxiliary driver-engagement rack of headrest-lock mover 224 is coupled to the opposite second inner edge of activation handle 223H to engage teeth in second motion-transfer gear 232. First headrest-motion blocker 221 includes a first rack-support strip 221S having an upwardly facing surface facing away from seat bottom 214 as suggested in FIGS. 9 and 13. The another drive-engagement rack 242 of headrest-lock mover 224 is coupled to the upwardly facing surface of the first rack-support strip 221S to engage teeth in first motion-transfer gear 231. The second headrest-motion blocker 222 includes a second rack-support strip 222S having a downwardly facing surface facing toward seat bottom 214. The another auxiliary drive-engagement rack 244 of headrest-lock mover 224 is coupled to the downwardly facing surface of the second rack-support strip 222S to engage teeth in the first motion-transfer gear 231 as suggested in FIGS. 9 and 13.

The adjustable headrest 217 includes a head cradle 217C configured to receive a head of a child seated on seat bottom 214 and a palm-grip portion 217P coupled to an upper portion of head cradle 217C and formed to include a forward-facing handgrip window 217W that will be visible to a caregiver facing a front side of the head cradle 217C and an upper end of activation handle 223H includes an operator fingergrip that has a downwardly facing bottom edge 223E that is adapted to engaged by finger tips of a hand of a caregiver while a palm of that hand rests on an upwardly facing outer palm-support surface of palm-grip portion 217P of the adjustable headrest 217 and that is exposed in the forward-facing window 217W to be seen and touched by the caregiver when activation handle 223H is urged downwardly relative to backrest 218 by a spring force generated by return spring 223S and applied to activation handle 223H.

The downwardly facing bottom edge 223E of the operator fingergrip moves upwardly in the forward-facing handgrip window 217W formed in the palm-grip portion 217P of the adjustable headrest 217 in a direction away from seat bottom 214 to move activation handle 223H relative to backrest 218 and against a spring force generated by return spring 223S in response to application of an upwardly directed movement-inducing force applied to the downwardly facing bottom edge 223E of the operator fingergrip by fingertips of an operator while a palm of the operator is at rest on the upwardly facing palm-support surface of the palm-grip portion 217P of the adjustable headrest 217.

The invention claimed is:

1. A child restraint comprising
a seat bottom,
a seat back including a backrest arranged to extend upwardly from the seat bottom and an adjustable headrest mounted for up-and-down movement on the backrest between a lowered position located at a first distance from the seat bottom and a raised position located at a relatively higher second distance from the seat bottom to accommodate and seat children of different sizes, and
a headrest-height controller mounted on the adjustable headrest for up-and-down movement with the adjustable headrest relative to the backrest, the headrest-height controller includes a headrest lock arranged to move relative to the seat bottom to engage and disengage the backrest to control up-and-down movement of the adjustable headrest between the lowered and raised positions, a mover activator including an activation handle mounted on the adjustable headrest for up-and-down movement relative to the adjustable headrest and the backrest, and a headrest-lock mover arranged to move the headrest lock relative to the backrest to disengage the backrest to free the adjustable headrest to move up and down relative to the backrest in response to upward movement of the activation handle relative to the backrest and away from the seat bottom and to engage the backrest to retain the headrest in a selected one of the lowered and raised positions in response to downward movement of the adjustable headrest relative to the backrest and toward the seat bottom upon arrival of the adjustable headrest at such a selected one of the lowered and raised positions and during downward movement of the activation handle relative to the backrest,
wherein the backrest is formed to include a lower set of opposing first and second blocker-receiver sockets located at a first height above the seat bottom to align with the lowered position of the adjustable headrest and an upper set of first and second opposing blocker-receiver sockets located at a relatively higher second height above the seat bottom to align with the raised position of the adjustable headrest and
wherein the headrest lock includes a first headrest-motion blocker that is constrained to move laterally relative to the adjustable headrest
to extend into the first blocker-receiver socket of the lower set to engage the backrest in response to application of an outward movement-inducing force applied to the first headrest-motion blocker by the headrest-lock mover when the adjustable headrest is located in the lower position and the activation handle is moved downwardly relative to the backrest and toward the seat bottom and
to withdraw from the first blocker-receiver socket of the lower set to disengage the backrest in response to application of an inward movement-inducing force applied to the first headrest-motion blocker by the headrest-lock mover when the adjustable headrest is located in the lower position and the activation handle is moved upwardly relative to the backrest and away from the seat bottom to establish a headrest-unlocking mode of the headrest-height controller.

2. The child restraint of claim 1, wherein the headrest-lock mover includes one driver-engagement rack coupled to the activation handle, another driver-engagement rack coupled to the first headrest-motion blocker, and a rotary driver mounted for rotation relative to the backrest to convert motion of the activation handle relative to the backrest into motion of the first headrest-motion blocker relative to the backrest owing to meshing engagement of teeth in the rotary driver with the driver-engagement racks to cause the outward and inward movement-inducing forces to be applied to the first headrest-motion blocker in response to movement of the activation handle relative to the backrest.

3. The child restraint of claim 2, wherein the mover activator of the headrest-height controller further includes a return spring that is coupled to each of the activation handle and the backrest and biased normally and yieldably to urge the activation handle to move downwardly relative to the backrest and toward the seat bottom to rotate the rotary driver included in the headrest-lock mover owing to meshing engagement of teeth in the driver-engagement rack coupled to the activation handle and teeth in the rotary driver so that rotation of the rotary driver moves the first headrest-motion blocker relative to the backrest to extend into the first blocker-receiver socket of the lower set owing to meshing engagement of the teeth in the rotary driver and of teeth in the driver-engagement rack coupled to the first headrest-motion blocker as the rotary driver rotates relative to the backrest.

4. The child restraint of claim 3, wherein the headrest lock further includes a second headrest-motion blocker that is constrained to move laterally relative to the adjustable headrest and laterally away from the first headrest-motion blocker to extend into the second blocker-receiver socket of the lower set to engage the backrest in response to application of an outward movement-inducing force applied to the second headrest-motion blocker by the headrest-lock mover when the adjustable headrest is located in the lower position and the activation handle is moved downwardly relative to the backrest and toward the seat bottom to establish a headrest-locking mode of the headrest-height controller and to withdraw from the second blocker-receiver socket of the lower set to disengage the backrest in response to application of an inward movement-inducing force applied to the second headrest-motion blocker by the headrest-lock mover when the adjustable headrest is located in the lower position and the activation handle is moved upwardly relative to the backrest and away from the seat bottom to establish a headrest-unlocking mode of the headrest-height controller.

5. The child restraint of claim 4, wherein the headrest-lock mover further includes one auxiliary driver-engagement rack coupled to the activation handle, another auxiliary driver-engagement rack coupled to the second headrest-motion blocker, and the rotary driver is mounted for rotation relative to the backrest to convert motion of the activation handle relative to the backrest into motion of the second headrest-motion blocker relative to the backrest owing to meshing engagement of teeth in the rotary driver with the auxiliary engagement racks to cause outward and inward movement-inducing forces to be applied to the second headrest-motion blocker in response to movement of the activation handle relative to the backrest.

6. The child restraint of claim 5, wherein the rotary driver comprises a first motion-transfer gear that is mounted on the backrest for rotation about a first axis of rotation and a second motion-transfer gear that is mounted for rotation about a second axis of rotation that lies in spaced-apart parallel relation to the first axis of rotation, the first motion-transfer gear includes teeth that mesh with teeth included in the driver-engagement racks that are coupled to the activation handle and to the first headrest-motion blocker during rotation of the first motion-transfer gear about the first axis of rotation, and the second motion-transfer gear includes teeth that mesh with teeth included in the auxiliary driver-engagement racks that are coupled to the activation handle and to the second headrest-motion blocker during rotation of the second motion-transfer gear about the second axis of rotation.

7. The child restraint of claim 6, wherein the first motion-transfer gear is mounted on a first axle coupled to the backrest to rotate in a clockwise direction and the second motion-transfer gear is mounted on a separate second axle coupled to the backrest to rotate in a counterclockwise direction when the first motion-transfer gear rotates in the clockwise direction.

8. The child restraint of claim 6, wherein the activation handle includes a first side facing toward the first blocker-receiver socket of the lower set and an opposite second side facing toward the second blocker-receiver socket of the lower set, the one driver-engagement rack of the headrest-lock mover is coupled to the first side of the activation handle to engage teeth in the first motion-transfer gear, the one auxiliary driver-engagement rack of the headrest-lock mover is coupled to the opposite second side of the activation handle to engage teeth in the second motion-transfer gear, the first headrest-motion blocker includes a topside arranged to face upwardly away from the seat bottom, the another driver-engagement rack of the headrest-lock mover is coupled to the topside of the first headrest-motion blocker to engage teeth in the first motion-transfer gear, the second headrest-motion blocker includes a topside arranged to face upwardly away from the seat bottom, and the another auxiliary driver-engagement rack of the headrest-lock mover is coupled to the topside of the second headrest-motion blocker to engage teeth in the second motion-transfer gear.

9. The child restraint of claim 5, wherein the rotary driver comprises a first motion-transfer gear, a second motion-transfer gear, and a gear mount arranged to lie between and interconnect the first and second motion-transfer gears so that the first and second motion-transfer gears rotate in the same direction about a common axis of rotation relative to the backrest, the first motion-transfer gear includes teeth that mesh with the teeth included in the driver-engagement racks that are coupled to the activation handle and to the first headrest-motion blocker during rotation of the first motion-transfer gear about the common axis of rotation, and the second motion-transfer gear includes teeth that mesh with teeth included in the auxiliary driver-engagement racks that are coupled to the activation handle and to the headrest-motion blocker during rotation of the second motion-transfer gear about the common axis of rotation.

10. The child restraint of claim 9, wherein the activation handle includes a first inner edge facing toward the second blocker-receiver socket of the lower set and an opposite second inner edge facing toward the first inner edge and the first blocker-receiver socket of the lower set, the one driver-engagement rack of the headrest-lock mover is coupled to the first inner edge of the activation handle to engage teeth in the second motion-transfer gear, the one auxiliary driver-engagement rack of the headrest-lock mover is coupled to the opposite second inner edge of the activation handle to engage teeth in the second motion-transfer gear, the first headrest-motion blocker includes a first rack-support strip having an upwardly facing surface facing away from the seat bottom, the another drive-engagement rack of the headrest-lock mover is coupled to the upwardly facing surface of the first rack-support strip to engage teeth in the first motion-transfer gear, the second headrest-motion blocker includes a second rack-support strip having a downwardly facing surface facing toward the seat bottom, and the another auxiliary drive-engagement rack of the headrest-lock mover is coupled to the downwardly facing surface of the second rack-support strip to engage teeth in the first motion-transfer gear.

11. The child restraint of claim 9, wherein the adjustable headrest includes a head cradle configured to receive a head of a child seated configured to receive a head of a child seated on the seat bottom and palm-grip portion coupled to an upper portion of the head cradle and formed to include a forward-facing handgrip window that will be visible to a caregiver facing a front side of the head cradle and an upper end of the activation handle includes an operator finger grip that has a downwardly facing bottom edge that is adapted to engaged by finger tips of a hand of a caregiver while a palm of that hand rests on an upwardly facing outer palm-support surface of the palm-grip portion of the adjustable headrest and that is exposed in the forward-facing window to be seen and touched by the caregiver when the activation handle is urged downwardly relative to the backrest by a spring force generated by the return spring and applied to the activation handle.

12. The child restraint of claim 10, wherein the downwardly facing bottom edge of the operator finger grip moves upwardly in the forward-facing handgrip window formed in the palm grip portion of the adjustable headrest in a direction away from the seat bottom to move the activation handle relative to the backrest and against a spring force generated by the return spring in response to application of an upwardly directed movement-inducing force applied to the downwardly facing bottom edge of the operator finger grip by fingertips of an operator while a palm of the operator is at rest on the upwardly facing palm-support surface of the palm grip portion of the adjustable headrest.

13. A child restraint comprising
a seat bottom,
a seat back including a backrest arranged to extend upwardly from the seat bottom and an adjustable headrest mounted for up-and-down movement on the backrest between a lowered position located at a first distance from the seat bottom and a raised position located at a relatively higher second distance from the seat bottom to accommodate and seat children of different sizes, and
a headrest-height controller mounted on the adjustable headrest for up-and-down movement with the adjustable headrest relative to the backrest, the headrest-height controller includes a headrest lock arranged to move relative to the seat bottom to engage and disengage the backrest, a mover activator including an activation handle mounted on the adjustable headrest for up-and-down movement relative to the adjustable headrest and the backrest, and a headrest-lock mover arranged to move the headrest lock relative to the backrest to disengage the backrest to free the adjustable headrest to move up and down relative to the backrest and to engage the backrest to retain the headrest in a selected one of the lowered and raised positions,
wherein the headrest-lock mover includes a driver-engagement rack coupled to the activation handle and a rotary driver mounted for rotation relative to the backrest to convert motion of the activation handle relative to the backrest into motion of the headrest lock relative to the backrest owing to meshing engagement of teeth in the rotary driver with the driver-engagement rack.

14. The child restraint of claim 13, wherein the backrest is formed to include a lower set of opposing first and second blocker-receiver sockets located at a first height above the seat bottom to align with the lowered position of the adjustable headrest and an upper set of first and second opposing blocker-receiver sockets located at a relatively higher second height above the seat bottom to align with the raised position of the adjustable headrest, and
wherein the headrest lock includes a first headrest-motion blocker that is constrained to move laterally relative to the adjustable headrest to extend into the first blocker-receiver socket of the lower set to engage the backrest in response to application of an outward movement-inducing force applied to the first headrest-motion blocker by the headrest-lock mover when the adjustable headrest is located in the lower position and the activation handle is moved downwardly relative to the backrest and toward the seat bottom and to withdraw from the first blocker-receiver socket of the lower set to disengage the backrest in response to application of an inward movement-inducing force applied to the first headrest-motion blocker by the headrest-lock mover when the adjustable headrest is located in the lower position and the activation handle is moved upwardly relative to the backrest and away from the seat bottom to establish a headrest-unlocking mode of the headrest-height controller.

15. The child restraint of claim 14, wherein the mover activator of the headrest-height controller further includes a return spring that is coupled to each of the activation handle and the backrest and biased normally and yieldably to urge the activation handle to move downwardly relative to the backrest and toward the seat bottom to rotate the rotary driver included in the headrest-lock mover owing to meshing engagement of teeth in the driver-engagement rack coupled to the activation handle and teeth in the rotary driver so that rotation of the rotary driver moves the first headrest-motion blocker relative to the backrest to extend into the first blocker-receiver socket of the lower set owing to meshing engagement of the teeth in the rotary driver and of teeth in another driver-engagement rack coupled to the first headrest-motion blocker as the rotary driver rotates relative to the backrest.

16. The child restraint of claim 15, wherein the headrest lock further includes a second headrest-motion blocker that is constrained to move laterally relative to the adjustable headrest and laterally away from the first headrest-motion blocker
to extend into the second blocker-receiver socket of the lower set to engage the backrest in response to application of an outward movement-inducing force applied to the second headrest-motion blocker by the headrest-lock mover when the adjustable headrest is located in the lower position and the activation handle is moved downwardly relative to the backrest and toward the seat bottom to establish a headrest-locking mode of the headrest-height controller and
to withdraw from the second blocker-receiver socket of the lower set to disengage the backrest in response to application of an inward movement-inducing force applied to the second headrest-motion blocker by the headrest-lock mover when the adjustable headrest is located in the lower position and the activation handle is moved upwardly relative to the backrest and away from the seat bottom to establish a headrest-unlocking mode of the headrest-height controller.

17. The child restraint of claim 16, wherein the headrest-lock mover further includes one auxiliary driver-engagement rack coupled to the activation handle, another auxiliary driver-engagement rack coupled to the second headrest-motion blocker, and the rotary driver is mounted for rotation relative to the backrest to convert motion of the activation handle relative to the backrest into motion of the second headrest-motion blocker relative to the backrest owing to meshing engagement of teeth in the rotary driver with the auxiliary engagement racks to cause outward and inward movement-inducing forces to be applied to the second headrest-motion blocker in response to movement of the activation handle relative to the backrest.

18. The child restraint of claim 17, wherein the rotary driver comprises a first motion-transfer gear that is mounted on the backrest for rotation about a first axis of rotation and a second motion-transfer gear that is mounted for rotation about a second axis of rotation that lies in spaced-apart parallel relation to the first axis of rotation, the first motion-transfer gear includes teeth that mesh with teeth included in the driver-engagement racks that are coupled to the activation handle and to the first headrest-motion blocker during rotation of the first motion-transfer gear about the first axis of rotation, and the second motion-transfer gear includes teeth that mesh with teeth included in the auxiliary driver-engagement racks that are coupled to the activation handle and to the second headrest-motion blocker during rotation of the second motion-transfer gear about the second axis of rotation.

19. The child restraint of claim 18, wherein the first motion-transfer gear is mounted on a first axle coupled to the backrest to rotate in a clockwise direction and the second motion-transfer gear is mounted on a separate second axle coupled to the backrest to rotate in a counterclockwise direction when the first motion-transfer gear rotates in the clockwise direction.

* * * * *